(12) United States Patent
Mahieu et al.

(10) Patent No.: US 12,352,903 B1
(45) Date of Patent: Jul. 8, 2025

(54) LIDAR DEBRIS DETECTION BASED ON ANNOTATED IMAGE DATA

(71) Applicant: Zoox, Inc., Foster City, CA (US)

(72) Inventors: Robert Evan Mahieu, San Mateo, CA (US); David Pfeiffer, Foster City, CA (US); Zeng Wang, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 437 days.

(21) Appl. No.: 17/977,996

(22) Filed: Oct. 31, 2022

(51) Int. Cl.
| | |
|---|---|
| *G01S 7/497* | (2006.01) |
| *G01S 17/89* | (2020.01) |
| *G01S 17/931* | (2020.01) |
| *G06T 7/11* | (2017.01) |
| *G06T 7/174* | (2017.01) |
| *B60W 60/00* | (2020.01) |

(52) U.S. Cl.
CPC ............ *G01S 7/497* (2013.01); *G01S 17/89* (2013.01); *G01S 17/931* (2020.01); *G06T 7/11* (2017.01); *G06T 7/174* (2017.01); *B60W 60/001* (2020.02); *B60W 2420/408* (2024.01); *G01S 2007/4975* (2013.01); *G06T 2207/20081* (2013.01)

(58) Field of Classification Search
CPC ........ G01S 7/497; G01S 17/89; G01S 17/931; G01S 2007/4975; G06T 7/11; G06T 7/174; G06T 2207/20081; B60W 60/001; B60W 2420/408

USPC ........................................................ 382/104
See application file for complete search history.

(56) References Cited

U.S. PATENT DOCUMENTS

| | | | |
|---|---|---|---|
| 9,672,446 B1 * | 6/2017 | Vallespi-Gonzalez | ...................... H04N 13/239 |
| 11,449,067 B1 * | 9/2022 | Allais | .................. B60W 60/001 |
| 11,543,531 B2 * | 1/2023 | Li | .............................. G06T 7/70 |
| 12,044,779 B2 * | 7/2024 | Zhou | ........................ G06F 16/51 |
| 2019/0340775 A1 * | 11/2019 | Lee | .......................... G05D 1/024 |
| 2021/0342609 A1 * | 11/2021 | Smolyanskiy | .......... G06V 20/58 |
| 2023/0417885 A1 * | 12/2023 | Gupta | ...................... G01S 17/86 |
| 2024/0371186 A1 * | 11/2024 | Alonazi | ................ G01S 7/4808 |

\* cited by examiner

*Primary Examiner* — Negussie Worku
(74) *Attorney, Agent, or Firm* — Lee & Hayes, P.C.

(57) ABSTRACT

Techniques for identifying lidar points associated with static objects, and using such lidar points to annotate objects within two-dimensional images are discussed herein. In some examples, an object manager may receive accumulations of lidar data captured from lidar devices of a vehicle while traversing within a driving environment. In some examples, the object manager may receive a plurality of annotated images. Such annotations may identify static objects within the driving environment. In some instances, the object manager may project a lidar point into an annotated image and determine that the lidar point is associated with an annotated pixel. Based on the pixel being associated with the annotated object, the object manager may determine that the lidar point is associated with object. In some examples, the object manager may determine a subset of lidar points that are associated with the object.

20 Claims, 9 Drawing Sheets

LIDAR DEBRIS DETECTION BASED ON ANNOTATED IMAGE DATA

BACKGROUND

Autonomous vehicles can use sensors to capture data of an environment. To navigate an environment effectively, autonomous vehicles use sensor data to detect objects in the environment to avoid collisions. A perception system, using such sensor data, allows an autonomous vehicle to recognize objects in the environment so that the autonomous vehicle can plan a safe route through the environment. In some examples, such sensor data may be refined and used by the perception system to enhance accuracy of object detection. However, refining such sensor data may be cumbersome and inefficient.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
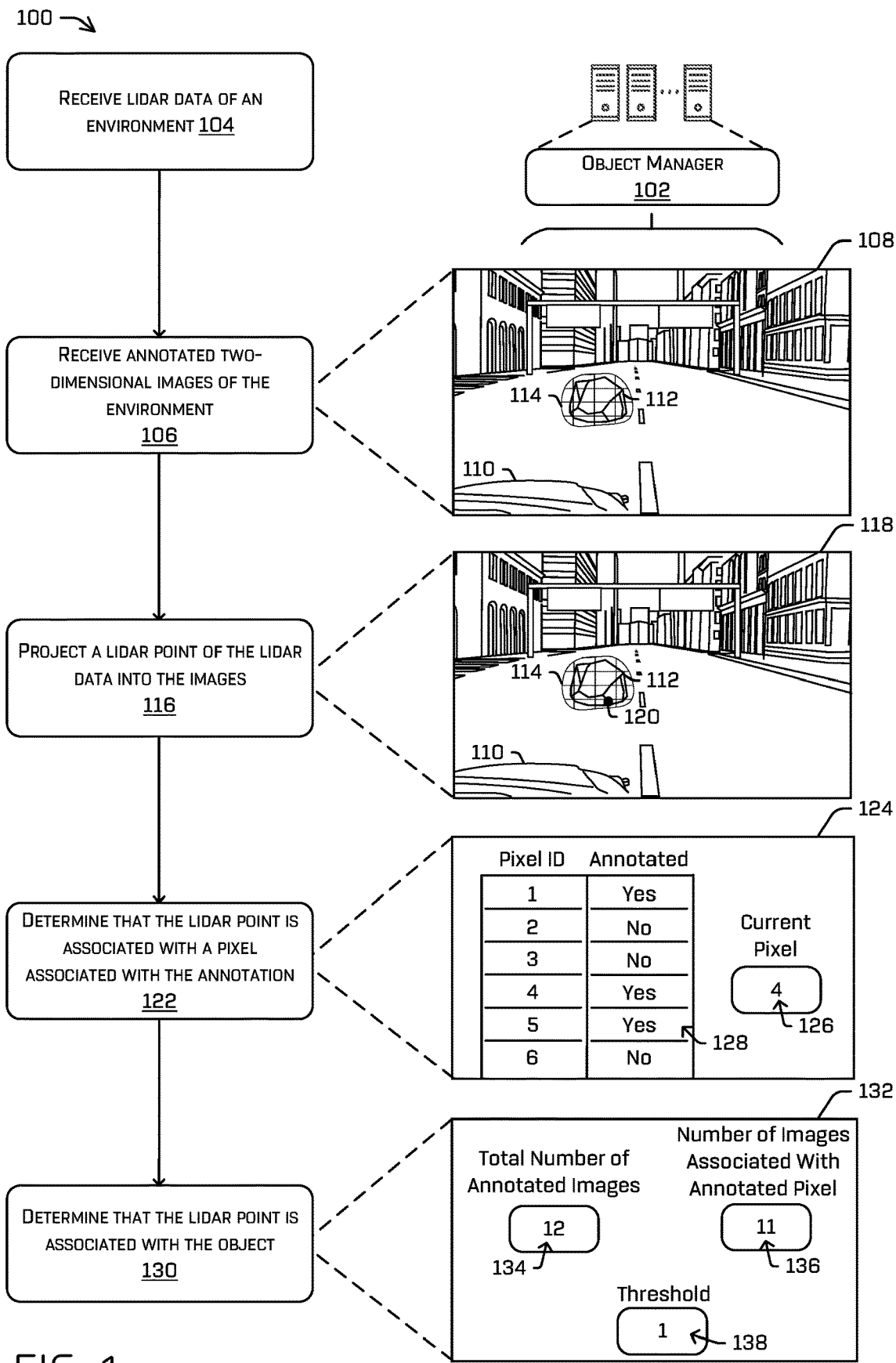
FIG. 1 is a pictorial flow diagram illustrating an example technique for identifying lidar points that is associated with an object based on annotated two-dimensional images, in accordance with one or more examples of the disclosure.

This disclosure describes techniques that can be used for identifying lidar points that are associated with static objects and using such lidar points to annotate objects within two-dimensional images. As described herein, annotated two-dimensional images may be used to identify and/or segment lidar points associated with static objects. In some examples, an object manager may receive accumulations of lidar data captured from lidar devices of a vehicle while traversing within a driving environment. In some examples, the object manager may receive a plurality of annotated images. Such annotations may identify static objects within the driving environment. In some instances, the object manager may project a lidar point (e.g., of the accumulation of lidar data) into an annotated image and determine that the lidar point is associated with an annotated pixel. Based on the pixel being associated with the annotated object, the object manager may determine that the lidar point is associated with segmentation data representing the object. In some examples, the object manager may determine a subset of lidar points that is associated with the object.

In some examples, the object manager may project the subset of lidar points into an unannotated two-dimensional image. For example, the object manager may project the subset of lidar points into the unannotated image, and determine a subset of pixels (e.g., of the unannotated image) that are associated with the lidar points. The object manager may dilate the subset of pixels, and determine that the dilated pixels intersect (e.g., overlap, touch, adjacent, etc.). Further, the object manager may determine that the intersecting pixels are associated with the same segment identifier (e.g., group identifier). Based on the pixels intersecting and being associated with the same segment identifier, a contour may be rendered around the corresponding non-dilated pixels to identify an object in the image data. As discussed throughout this disclosure, the techniques may improve vehicle safety and driving efficiency by identifying a number of lidar points that are associated with static objects, and using such lidar data to annotate two-dimensional images. In some instances, such techniques allow the vehicle to perform safer and more efficient driving maneuvers.

When an autonomous vehicle is operating within a driving environment, the vehicle may receive sensor data (e.g., captured by sensors of the vehicle or received from remote sensors) of the surrounding environment. The sensor data, which may include image data, radar data, lidar data, time-of-flight data, etc., may be analyzed by the autonomous vehicle to detect and classify various objects within the operating environment. An autonomous vehicle may encounter various different types of objects within different driving environments, including dynamic objects that are capable of movement (e.g., vehicles, motorcycles, bicycles, pedestrians, animals, etc.) and/or static objects that are stationary (e.g., certain types of debris, buildings, road surfaces, trees, signs, barriers, parked vehicles, etc.). In order to safely traverse driving environments, an autonomous vehicle may include various components configured to detect objects and determine attributes of the detected objects. In some examples, a perception component of the autonomous vehicle may include various models and/or components to detect objects, perform semantic and/or instance segmentation of the objects, determine boundaries (e.g., bounding boxes, contours, etc.) associated with the objects and/or pixels within image data, classify and analyze the objects, track the objects, etc. For instance, the perception component may receive various modalities of sensor data from the vehicle sensors (e.g., image data, lidar data, radar data, etc.) and may analyze the data to detect an object near the vehicle, classify the object as an object type (e.g., car, truck, motorcycle, pedestrian, cyclist, animal, building, tree, etc.), and determine various additional or alternative features or attributes of the object based on its classification. The perception component may use one or more trained machine learning models and/or heuristics-based components to efficiently detect, identify, and track objects while traversing the driving environment.

Machine learning models configured to perform various object detection functionality, such as object identification, classification, instance segmentation, semantic segmentation, object tracking, and the like, may be implemented using artificial neural networks and trained with model training data (e.g., ground truth data). In certain systems, model training data may be generated using manual techniques, in which a user interface is provided depicting a driving environment and a user is instructed to identify static objects (e.g., debris) and annotate (e.g., label) the static objects by rendering a color over the static objects. However, fully manual identification and labeling of objects can be a time-consuming, inefficient, and error-prone technique for generating model training data.

To address the technical problems and inefficiencies of manually generating model training data for object detection systems, the techniques described herein may include using an object manager-based system (which also may be referred to as an "object manager") to identify lidar points associated with static objects using sparsely annotated two-dimensional image datasets, and using such lidar points to project, and annotate, non-annotated images from the dataset (e.g., images at different times from the annotated ones). Technical solutions discussed herein solve technical problems associated with manually labeling large volumes of image data capable of being used as machine learning training data.

Initially, the object manager may receive lidar data captured by lidar sensors of an autonomous vehicle traversing within an environment. The object manager may be integrated as a separate server-based system. The object manager may receive lidar data and image data captured by sensors of the vehicle (e.g., driving log data) based on previous driving drips within various physical (or real-world) driving environments.

In such examples, the autonomous vehicle may include multiple lidar devices configured to receive lidar data of the driving environment. Further, the object manager may receive lidar data from a number of lidar devices mounted or installed at different locations on a vehicle and/or a same lidar at different times as the vehicle traverses the environment. In such examples, the lidar data may include a set of lidar points representative of lidar detections of physical objects in the environment.

In some examples, the object manager may receive lidar data captured over a period of time. For example, the object manager may receive lidar data captured by the vehicle over a period of time (e.g., six seconds, eight seconds, ten seconds, sixty seconds, etc.). The object manager may receive the lidar data as a single lidar point cloud. In such examples, the object manager or any other component of the vehicle may transform and accumulate the lidar points received over the pre-determined period of time. For example, the object manager may transform and/or accumulate the lidar points to a global reference frame (e.g., global coordinate frame). The global reference frame may be any location within the environment.

In some examples, the object manager may receive a plurality of two-dimensional images captured by image capturing devices (e.g., cameras) of an autonomous vehicle traversing within the environment. In some examples, the autonomous vehicle may include multiple image capturing devices configured to receive image data of the driving environment. Further, the object manager may receive image data from any number of image capturing devices mounted or installed at different locations on the vehicle and/or a same image capturing device at different times as the vehicle traverses through the environment. In some examples, the image data may include a set of pixels with associated pixel identifiers.

In some examples, the object manager may receive a plurality of images captured over a period of time. The object manager may receive a plurality of images at various times, spanning a period of time (e.g., six seconds, eight seconds, etc.). For example, the object manager may receive one or more images associated with a first time, one or more images associated with a second time, one or more images associated with a third time, etc. In such examples, the images at the various time steps may be received from a variety of different cameras. Further, some of the images received by the object manager may be annotated by human annotators (or other high quality annotation algorithms not constrained by real-time compute requirements), while some images may not be annotated. The annotations may identify static objects (e.g., objects located at a geographical position for a threshold amount of time) within the images. As such, the object manager may have a first set of images (e.g., spanning a time period) which have been annotated by human labelers, and a second set of images (e.g., spanning the same or similar time period) which are not annotated.

In some examples, the object manager may project a lidar point of the accumulation of lidar points into some or all of the annotated images. The object manager may project the lidar point into the annotated images by associating the lidar point with the corresponding pixel of the image data. In some examples, the projection of the lidar point into the image by the object manager may be based on performing one or more transformations to the lidar data. Such transformations may include transforming the lidar point from the global reference frame to a reference frame of the autonomous vehicle, and further transforming the lidar point from the vehicle reference frame to the reference frame of the image capturing device. In some examples, the object manager may determine that the lidar point is associated with a pixel within the image.

In some examples, the object manager may determine that the pixel is associated with the annotation. The object manager may identify pixels based on the location of the pixel within the image and/or pixel identification values. As such, based on the determining that the lidar point is associated with the pixel, the object manager may identify the location and/or pixel identifier of the pixel. The object manager may determine that the location and/or pixel identifier of the pixel are associated with the annotation. For example, the location of the pixel may correspond to the location of the annotation within the image. Further, the object manager may determine that the pixel identifier of the pixel may be identified as a pixel identifier associated with the annotation.

In some examples, the object manager may determine that the lidar point is associated with the annotated object. The object manager may determine that the lidar point is associated with the annotated object based on the lidar point projecting into an annotated pixel for a threshold number of the annotated images. For example, the object manager may have a total of six annotated images. Further, the object manager may project a lidar point into each of the six annotated image planes. In some examples, the object manager may determine that the lidar point projects within the bounds of the annotated image plane (e.g., lidar device and camera have similar or same field of view), and as such may be included in the total number annotated images. In other examples, the object manager may determine that the lidar point projects outside the bounds (e.g., frustrum) of the annotated image plane (e.g., lidar device and camera have differing fields of view), and may thus be excluded from the total number of annotated images. Based on the lidar point projecting within the bounds of the annotated image frame, the object manager may determine whether the lidar point is associated with an annotated pixel. Based on determining that the lidar point projects into an annotated pixel in a threshold number (e.g., five of the six images) of the total annotated images, the object manager may determine that the lidar point is associated with the annotated object. In some examples, at least a portion of the annotated images may be at different time steps, which may ensure that the object is a static object and/or that the human annotator did not make a mistake. In such examples, if the lidar point projects into an annotated pixel at a first time as well as projecting into an annotated pixel at a second time, this may illustrate that that object has not moved over a period of time and may be determined to be a static object with which the lidar point is associated. Of course, this example is not intended to be limiting, the object manager may receive more or less than six annotated images.

In some examples, the object manager may project some or all of the lidar points of the lidar data into the annotated images to determine whether each lidar point is associated with the annotated object. For example, the object manager may iterate through the numerous lidar points to determine whether such lidar points are associated with the annotated object. As such, the object manager may determine a subset of lidar points that are associated with the annotated object.

In some examples, the object manager may project the subset of lidar points into the one or more unannotated images. As described above, in addition to receiving the plurality of annotated images spanning a period of time, the object manager may receive one or more unannotated images spanning the same or similar period of time. The annotated images and unannotated images may be in any order (e.g., alternating, sequential, etc.) throughout the period of time. In some instances, the annotated images may be the first and last image of the period of time, while the unannotated images span the period of time between the annotated images. In some examples, the object manager my project the subset of lidar points into some or all of the unannotated images. In such examples, the object manager may perform the same or similar transformations described above.

In some examples, the object manager may determine that a subset of pixels may be associated with the projected subset of lidar points. For example, the projected subset of lidar points may be associated with a subset of pixels. In such examples, the subset of pixels and the subset of lidar points may be associated with a same or similar location of the physical environment.

In some examples, the object manager may connect of the subset of pixels in order to determine a region within which the static object may be located. In some examples, due to the potential sparseness of the subset of lidar points, the unannotated image may include pixels which may be associated with the object that are not included and/or represented in the subset of pixels. As such, the techniques described herein ensure that such pixels may be included and/or associated with the object. Accordingly, the object manager may dilate and connect the pixels based on the dilated pixels being adjacent to one another, and being associated with the same segment identifier.

In some examples, the object manager may perform a morphological operation to the subset of pixels. For example, the object manager may perform a dilation operation on the subset of pixels. The object manager may determine a dilated subset of pixels based on the subset of pixels associated with the subset of lidar points. In some examples, the object manager my apply a shaped (e.g., square, circle, etc.) kernel to the pixels in performing the dilation technique. In such examples, the dilation operation may include enlarging the pixel. As such, the dilated pixels may be at a same or similar resolution as the non-dilated pixels. In other examples, the dilation operation may include determining a buffer around each pixel of the subset of pixels. However, these examples are not intended to be limiting, the object manager may use different dilation techniques to dilate the subset of pixels.

In some examples, the object manager may use the dilated subset of pixels to determine that two or more of the dilated pixels are adjacent to one another. For example, dilated pixels may be adjacent if the dilated pixels overlap, touch, intersect, and/or are within a threshold distance from one another. In such instances, the threshold distance may be determined based on a number of different factors, such as the environment, the time of day, the number of dilated pixels, and/or other such factors. The object manager may use one or more trained machine learning models and/or heuristics-based components to efficiently determine whether dilated pixels intersect.

In some examples, the object manager may determine whether the adjacent dilated pixels are associated with the same segment identifier. Images may include one or more static objects. As such, to ensure that each static object is accurately annotated, the object manager may determine that each static object is associated with a different group or segment identifier. In such instances, the object manager may assign a segment identifier to dilated pixels which have been determined to be adjacent to one another. As such, dilated pixels which are adjacent to one another may be associated with the same segment identifier, and thus the same object.

Based on the dilated pixels being adjacent and being associated with the same segment identifier, the object manager may render a contour around the corresponding non-dilated pixels, annotating (e.g., color, pattern, etc.) (e.g., for a human visualization) the pixels within the contour. In some examples, the object manager may identify the non-dilated pixels that correspond to the dilated pixels. For example, the object manager may parse through the connected dilated pixels and identify the non-dilated pixel associated with each dilated pixel. Based on identifying the non-dilated pixels associated with the dilated pixels, the object manager may render a contour around such non-dilated pixels belonging to the same segment (e.g., same segment identifier). In such instances, the object manager may annotate the contour with a color, pattern, etc. In some examples, the annotated contour may be illustrative of the annotated object within the driving environment.

In some examples, the techniques described herein to identify lidar points that are associated with static objects and using such lidar points to annotate objects within two-dimensional images can also be used for analyzing sensor data captured by other sensor types, such as radar sensors, time-of-flight sensors, image capturing devices, and/or any other type of sensor. Further, such techniques can be used for analyzing fused sensor data captured from a plurality of different sensor modalities.

As shown in the various examples described herein, these techniques may improve the functioning, safety, and efficiency of autonomous and semi-autonomous vehicles operating in driving environments, by generating large numbers of accurate training data for machine learning models. Training data generated as described herein may improve the vehicle safety and efficiency based on improved training using larger amounts of more accurate training data derived from real-world driving log data. The training data for the machine learning models may be more detailed and accurate by leveraging existing techniques (e.g., human labeling, automated labeling, etc.), and then improving the training data based on using the existing training data to generate large volumes of additional training data. The improved training data can be used as feedback to improve the performance of existing models. The combination of user interface input and automated techniques also may provide advantages over fully manual techniques, including automated annotation propagation, as well as providing verification for the user interface input training data (e.g., eliminating user error). The various features and functionality described herein thus may provide improved efficiency in generating object detection training data, resulting in greater amounts of robust and highly accurate training data than would be possible using manual techniques or automated techniques alone.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or robotic platform), and are not limited to autonomous vehicles. In one example, similar techniques may be utilized in driver-controlled vehicles in which such a system may provide an indication of whether it is safe to perform various maneuvers. In other examples, any or all of the techniques described herein may be implemented in other machine vison systems, such as security systems, object inspection and/or quality assurance systems, environment monitoring systems, etc.

FIG. 1 is a pictorial flow diagram illustrating an example process 100 for determining lidar points associated with an object based on annotated two-dimensional images. Some or all of the operations in process 100 may be performed by an object manager component integrated as a separate server-based system. However, in other examples, the object manager may be integrated within a perception component, a prediction component, a planning component, and/or other components and systems within an autonomous vehicle.

At operation 104, the object manager 102 may receive lidar data collected by one or more lidar devices of an autonomous vehicle. The object manager 102 may receive lidar data captured by sensors of the vehicle (e.g., driving log data) based on previous driving drips within various physical (or real-world) driving environments. In such examples, a vehicle may include multiple lidar devices mounted at various locations and various angles relative to the vehicle, to capture lidar data of a driving environment and/or from a single sensor acquired at multiple times. The lidar data may include any number of lidar points representing individual lidar detections from the driving environment. In some examples, the object manager 102 may receive the lidar data spanning a period of time as a single point cloud. For example, the lidar data may be an accumulation of lidar points over a period of time (e.g., six seconds, eight seconds, etc.). In some instances, the object manager may transform the lidar points to a global frame of reference.

At operation 106, the object manager 102 may receive annotated two-dimensional images of the environment. The object manager may receive image data captured by sensors of the vehicle (e.g., driving log data) based on previous driving drips within various physical (or real-world) driving environments. As described above, the autonomous vehicle may include multiple image capturing devices configured to receive image data of the driving environment. Further, the object manager 102 may receive image data from a number of image capturing devices mounted or installed at different locations on the vehicle and/or a same image capturing device at different times as the vehicle traverses through the environment. In some examples, the image data may include a set of pixels with associated pixel identifiers.

In some examples, the object manager 102 may receive a plurality of images at various times, spanning the same or similar period of time as the lidar devices. In such instances, some of the images received by the object manager may be annotated by human annotators, while some images may not be annotated. The annotations may identify static objects within the images. For example, box 108 illustrates an autonomous vehicle 110 navigating a roadway and approaching a static object. In this example, the autonomous vehicle 110 may be approaching object 112. In this situation, the object 112 may be debris. As shown in box 108, the object 112 may be a rock; however, in other examples, the debris may be branch, trash, foliage, car parts, and/or any other debris or object that may be static in nature. Of course, in other examples there may be more or less debris objects.

In some examples, objects within the two-dimensional images may be annotated by human and/or machine labelers. As illustrated in box 108, the object 112 may include an annotation 114, representative of a static object. In this example, the annotation 114 of the object 112 may be illustrated by a checkered pattern; however, in other examples the annotation 114 may be a color and/or any other similar method to identify an object.

At operation 116, the object manager 102 may project a lidar point of the accumulated lidar data into the images. As described above, the object manager 102 may project a lidar point into the annotated images by associating the lidar point with the corresponding pixel of the image data. For example, box 118 illustrates a lidar point 120 projected into a two-dimensional image. In this example, the lidar point 120 may be projected into the image received at operation 106.

As described above, the object manager 102 may perform one or more transformations to the lidar point 120 when projecting the lidar point 120 into the image. Such transformations may include transforming the lidar point 120 from the global reference frame to a reference frame of the autonomous vehicle 110, and further transforming the lidar point 120 from the vehicle 110 reference frame to the reference frame of the image capturing device. In some examples, the object manager 102 may determine that the lidar point 120 is associated with a pixel within the image.

Additional description of lidar point transformation is discussed below in FIG. 5 and throughout this disclosure.

At operation 122, the object manager 102 may determine that the lidar point 120 is associated with a pixel which is associated with the annotation 114. As described above, the object manager 102 may use a pixel's location and/or pixel identification value to determine whether the pixel is associated with an annotation. For example, based on the determining that the lidar point is associated with the pixel, the object manager 102 may identify the location and/or pixel identifier of the pixel. The object manager 102 may determine that the location and/or pixel identifier of the pixel is associated with the annotation. For example, box 124 illustrates a table displaying multiple pixel identifiers in addition to the current pixel identifier. In this example, box 124 includes a current pixel identifier 126 associated with the current pixel. As displayed, the current pixel identifier is "4"; however, in other examples the current pixel identifier may be any other pixel identifier and/or pixel location. In this example, the box 124 includes a table 128 which displays a number of pixel identifiers, and information detailing whether the particular pixel identifier is associated with the annotation 114. As shown in box 124, based on the current pixel identifier 126 being "4", the object manager 102 may access the table 128 (e.g., stored in memory) and determine that the pixel with the pixel identifier displayed as "4" is associated with the annotation 114.

At operation 130, the object manager 102 may determine that the lidar point 120 is associated with segmentation data representative of the object 112. As described above, the object manager 102 may determine that the lidar point 120 is associated with the object 112 based on the lidar point 120 projecting into an annotated pixel for a threshold number of the annotated images. For example, box 132 illustrates statistics used to determine whether the lidar point 120 is associated with the object 112. In this example, box 132 include a total number of annotated images 134 statistic, which in this example is "12". This statistic illustrates the total number of images which were received by the object manager 102, included an annotated object, and determined that the lidar point 120 projected within the bounds (e.g., frustrum) of the image. Further, the box 132 includes the number of images that the lidar point 120 is associated with an annotated pixel 136 statistic, which in this example is "11". For this statistic, the object manager 102 may determine the number of images which the lidar point 120 was projected into and was associated with a pixel that was associated with the annotation 114. In some examples, the box 132 includes the threshold 138, which in this case is "1". As such, in this example, the object manager 102 projected the lidar point 120 into "12" annotated images, and the lidar point 120 was associated with an annotated pixel in "11" of the images. Based on the threshold 138 being "1", the object manager 102 may determine that the lidar point 120 is associated with the object.

Figure 2:
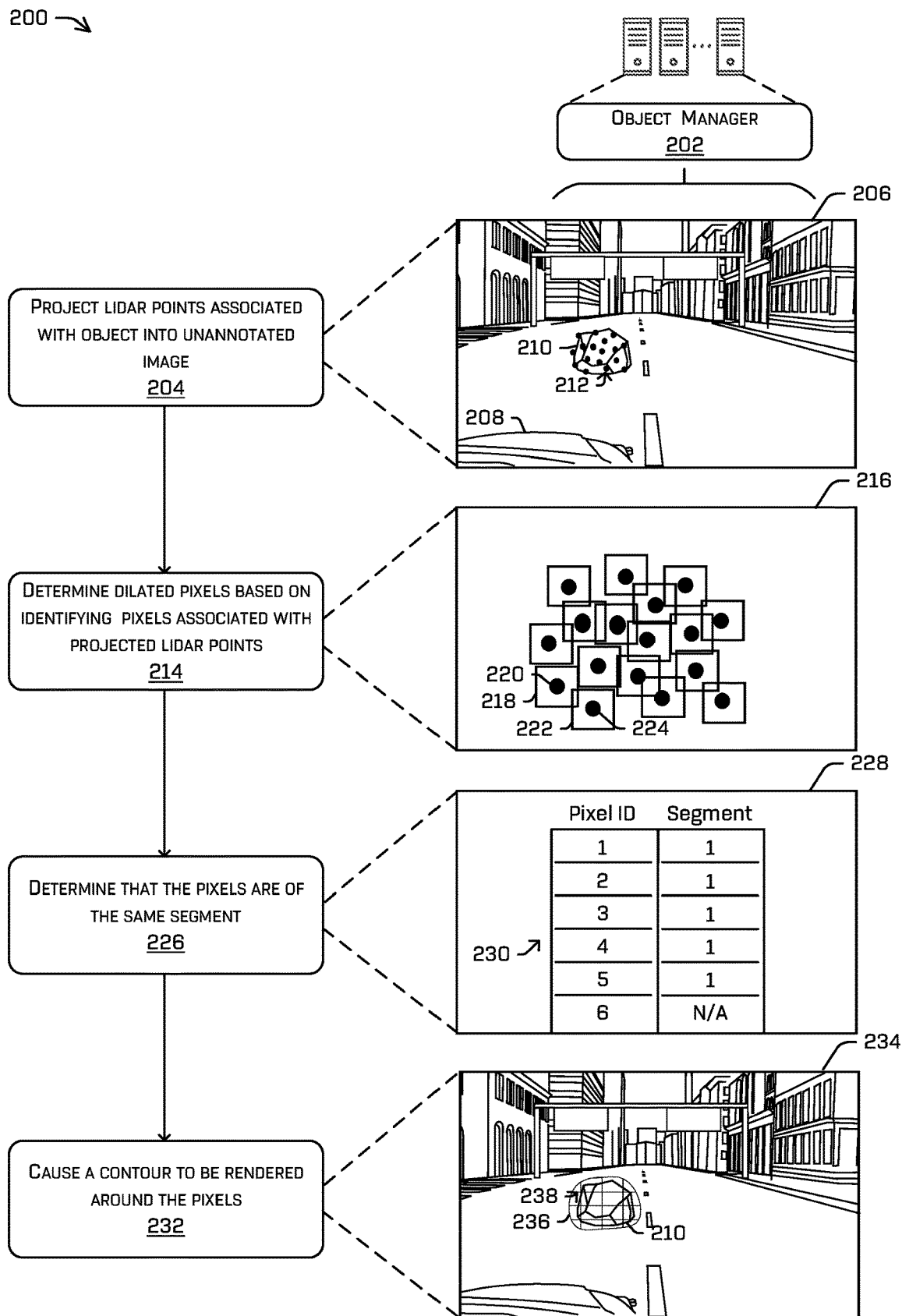
FIG. 2 is a pictorial flow diagram illustrating an example technique for annotating an object based on lidar points associated with the object, in accordance with one or more examples of the disclosure.

FIG. 2 is a pictorial flow diagram illustrating an example process 200 for determining a contour around an object based on lidar points that are associated with the object. Some or all of the operations in process 200 may be performed by an object manager component integrated within a perception component, a prediction component, a planning component, and/or other components and systems within an autonomous vehicle. However, in other examples, the object manager may be integrated as a separate server-based system. In some examples, the object manager 202 may be similar or identical to the object manager described above, or in any other examples herein.

At operation 204, the object manager 202 may project lidar points associated with an object into one or more unannotated images. As described above, the object manager 202 may determine that a subset of lidar points of the accumulated set of lidar points are associated with an object within the environment. In some examples, the object manager 202 may perform the same of similar techniques described in FIG. 1 to determine the subset of lidar points associated with an object. However, this is not intended to be limiting, the object manager 202 may use any number of techniques to identify lidar points that are associated with objects.

In some examples, the object manager 202 may receive one or more unannotated images. In such examples, the object manager 202 may project the subset of lidar points into some or all of the unannotated images. For example, the box 206 illustrates the object manager 202 projecting a subset of lidar points into the unannotated image. In this example, the box 206 includes an autonomous vehicle 208 navigating a driving environment. Further, box 206 illustrates the vehicle 208 approaching an object 210. In this example, the object 210 is debris. As shown in box 206, the object 210 may be a rock; however, in other examples, the debris may be a branch, trash, foliage, car parts, and/or any other debris or object that may be static in nature. In this example, the box 206 may include numerous lidar points 212 which have been projected into the image. In such examples, the lidar points 212 may be associated with an object.

At operation 214, the object manager 202 may determine a subset of dilated pixels based on identifying a subset of pixels of the image that are associated with the projected lidar points 212. As described above, the projected subset of lidar points may be associated with a subset of pixels. In such examples, the subset of pixels and the subset of lidar points may be associated with a same or similar location of the physical environment. In some examples, the object manager 202 may connect the subset pixels in order to determine a region within which the object 210 may be located.

In such examples, the object manager 202 manager may perform a dilation operation on the subset of pixels. The object manager 202 may determine a dilated subset of pixels based on the subset of pixels associated with the subset of lidar points. In some examples, the object manager 202 may apply a shaped (e.g., square, circle, etc.) kernel to the pixels in performing the dilation technique. Such a dilation technique may enlarge the pixel while the pixel remains at a same or similar resolution level. For example, box 216 illustrates a number of dilated pixels. In this example, box 216 includes a subset of pixels (e.g., black dots) which are associated with the projected subset of lidar points. Based on identifying the subset of pixels that are associated with the projected subset of lidar points, the object manager 202 may dilate the subset of pixels by applying a square kernel. As shown in box 216, pixel 220 may be dilated to a dilated pixel 218, and pixel 224 may be dilated to a dilated pixel 218.

In some examples, the object manager 202 may determine whether the dilated pixels are adjacent to one another. As described above, the object manager 202 may connect the pixels based on determining that the dilated pixels are adjacent to one another. In some examples, dilated pixels may be adjacent if the dilated pixels overlap, touch, intersect and/or are within a threshold distance from one another. In such instances, the threshold distance may be determined based on a number of different factors, such as the environment, the time of day, the number of dilated pixels, and/or other such factors. As shown in box 216, the object manager 202 may determine that dilated pixel 218 and dilated pixel 222 overlap with one another. As such, the object manager 202 may determine that dilated pixels 218 and dilated pixel 222 are adjacent pixels.

At operation 226, the object manager 202 may determine that the pixels are associated with the same segment. Since some images may include multiple objects, the object manager 202 may determine that each object is associated with a different group or segment identifier. In such examples, the object manager 202 may assign adjacent dilated pixels with the same segment identifier. In some examples, pixels which are determined to not be associated with the lidar point may not be assigned a segment identifier. For example, box 228 illustrates a table of pixel identifiers and the associated segment number. In this example, the table 230 includes six pixel identifiers with corresponding segment identifiers. Based on the two-dimensional image including a single object, the pixel identifiers may be associated with the same segment. In this example, the object manager 202 may determine that the dilated pixel 218 has a pixel identifier value of "1", while dilate pixel 222 has a pixel identifier value of "2". In this example, the object manager 202 may determine that the dilated pixels are associated with the same segment, and thus, the same object. Additionally, the pixel with the pixel identifier value of "6" may not have a segment identifier, as the pixel may not be associated with the projected lidar points.

At operation 232, the object manager 202 may cause a contour to be rendered around the pixels. Based on the dilated pixels being adjacent and associated with the same segment identifier, the object manager 202 may identify the non-dilated pixels (e.g., pixel 220 and pixel 224) that correspond to the dilated pixels (e.g., pixel 218 and pixel 222). The object manager 202 may render a contour around such non-dilated pixels. In such instances, the object manager may fill in the contour with a color, pattern, etc. For example, box 234 illustrates an annotation associated with the object 210. In this example, the box 234 includes a contour 236 which connects the pixel associated with the outer most edge of the object. Further, the box 234 includes an annotation 238 within the contour 236. In this example, the annotation 238 may be a checkered pattern; however, in other examples, the annotation 238 may be a color and/or any other similar annotation. In some examples, the annotation 238 in contour 236 may be illustrative of annotated object 210 within the driving environment.

In some examples, the object manager 202 may use the annotated image as input for training machine learning models to output detected static objects.

Figure 3:
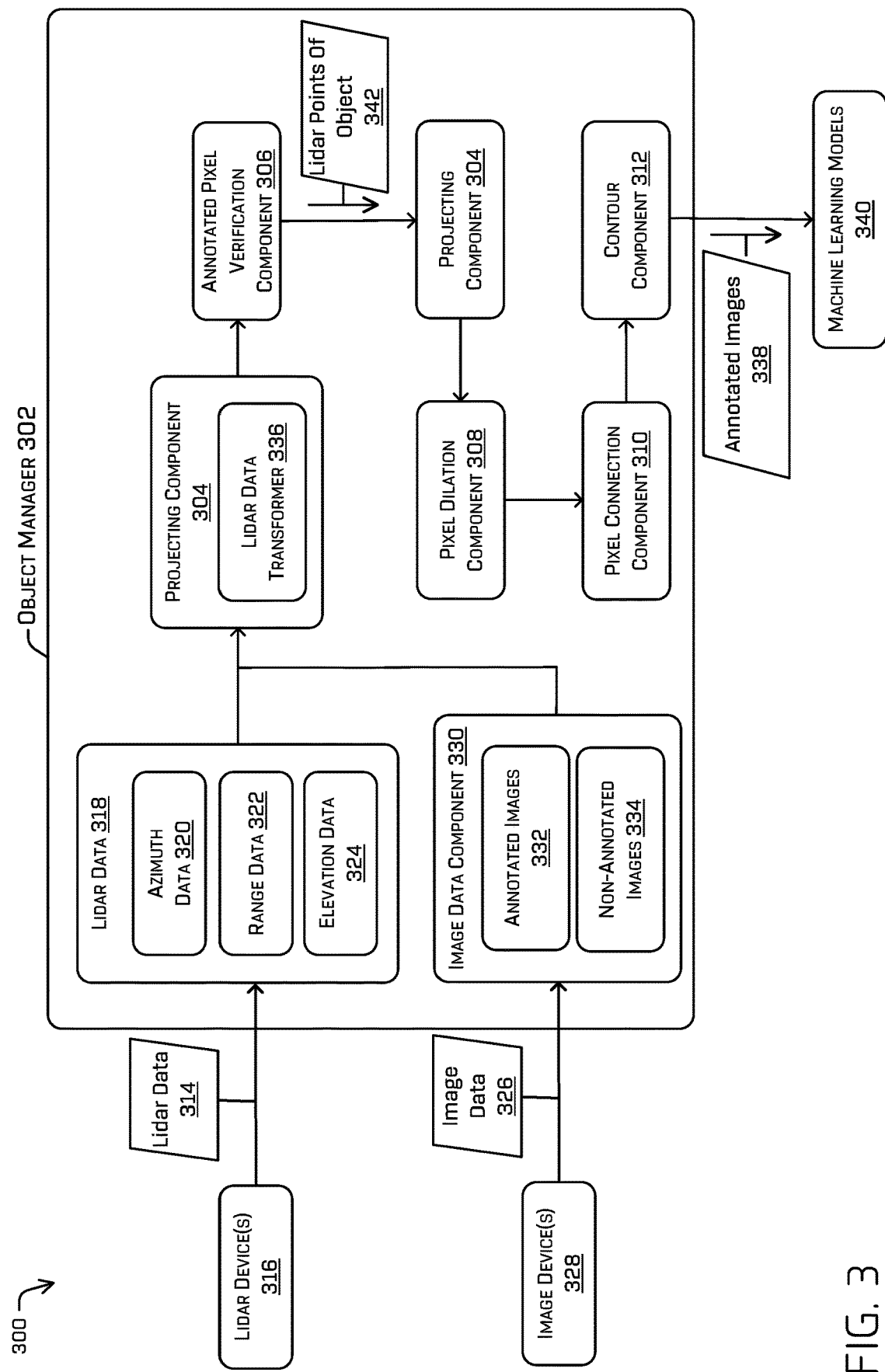
FIG. 3 illustrates an example computing system including an object manager configured to identify lidar data associated with an object based on annotated two-dimensional images, and annotate two-dimensional images using the lidar data, in accordance with one or more examples of the disclosure.

FIG. 3 illustrates an example computing system 300 including an object manager 302 configured to identify lidar data associated with an object based on annotated images, and annotate two-dimensional images using the lidar data. In some examples, the object manager 302 may be similar or identical to the object manager 102 or object manager 202 described above, or in any other examples herein. As noted above, in some cases the object manager 302 may be implemented within or otherwise associated with a perception component, prediction component, and/or planning component of an autonomous vehicle. However, in other examples, the object manager 302 may be integrated as a separate server-based system.

In some examples, the object manager 302 may include various components described below, configured to perform different functionalities of an object detection and image annotating techniques. For instance, the object manager 302 may include a projecting component 304 configured to project one or more lidar points into two-dimensional images. The object manager 302 may also include an annotated pixel verification component 306 configured to determine whether a pixel is associated with an annotation, a pixel dilation component 308 configured to determine a dilated subset of pixels based on dilating a subset of pixels associated with project lidar points, a pixel connection component 310 configured to determine a connection between the dilated pixels, and a contour component 312 configured to render a contour around the non-dilated pixels associated with the connected dilated pixels.

In some examples, the object manager 302 may receive lidar data 314 from one or more lidar device(s) 316 within (or otherwise associated with) an autonomous vehicle. Different lidar device(s) may be mounted or installed at different locations on the autonomous vehicle, and may include various types of lidar devices providing various elements (or parameters) of lidar data to the object manager 302. As shown in FIG. 3, a lidar device 316 may provide lidar data 314 to the object manager 302. In some examples, the lidar device(s) 316 may each capture unique lidar data based on the location and/or type of the lidar device. As shown in this example, the object manager 302 may include a lidar data component 318 configured to receive, store, and/or synchronize lidar data 314 from the lidar device 316 (e.g., and any additional lidar devices). The lidar data component 318 may include various subcomponents, described below, to receive, store, synchronize, and/or analyze the lidar data 314. A lidar device may capture any number of parameters of lidar data component 318 from any number of lidar devices. As shown in FIG. 3, the illustrated subcomponents are some of the possible lidar data parameters that a lidar device may capture. In some examples, a lidar device may capture more or less than the illustrated lidar data components shown in FIG. 3.

In this example, the lidar data component 318 may include one or more subcomponents associated with different lidar data components (or parameters). As illustrated in FIG. 3, the lidar device 316 may capture lidar data 314, including an azimuth data component 320, range data component 322, and elevation data component 324. In some examples, depending on the type of lidar device, the lidar device 316 may capture additional or fewer lidar data parameters. In this example, azimuth data component 320 may be used to determine, store, and/or synchronize a direction (or bearing) of detected objects relative to the lidar device(s). The range data component 322 may be used to receive, store, and/or synchronize the distance of detected objects relative to the lidar device(s). The elevation data component 324 may be used to determine, store, and/or synchronize the height of detected objects based on the lidar data 314.

In some examples, the object manager 302 may receive image data 326 from one or more image capturing device(s) 328 within (or otherwise associated with) an autonomous vehicle. Different image capturing device(s) may be mounted or installed at different locations on the autonomous vehicle, and may include various types of image capturing devices providing various resolution levels of image data 326 to the object manger 302. As shown in this example, the object manager 302 may include an image data component 330 configured to receive, store, and/or synchronize image data 326 from the image capturing device(s) 328. The image data component 330 may include various subcomponents, described below, to receive, store, synchronize, and/or analyze the image data 326. The image capturing device 328 may capture any number of images from a driving environment, and in some instances, some or all of the images may be annotated by a human and/or machine annotator. In such instances, the human annotator may label and/or classify the different objects within the image. As shown in FIG. 3, the illustrated subcomponents include annotated image and non-annotated images.

In some examples, the image data component 330 may include one or more subcomponents associated with whether an image has been annotated. As illustrated in FIG. 3, the image data component 330 may include annotated images 332 and non-annotated images 334. In some examples, annotated images 332 may be used to determine, store, and/or synchronize two-dimensional images which have been annotated by human and/or machine annotators. In some examples, the annotated images 332 may span a period time (e.g., six seconds, eight seconds, etc.). The non-annotated images 334 may be used to determine, store, and/or synchronize two-dimensional images which have not been annotated.

In some examples, the object manager 302 may include a projecting component 304 configured to project lidar data into two-dimensional images. The projection component 304 may include one or more subcomponents. In this example, the projecting component 304 may include a lidar data transformer 336 configured to perform transformation operations on the lidar data 314. The projecting component 304 may receive lidar data from the lidar data component 318. In such instances, the projecting component 304 may project the lidar data into an annotated image 332 of the image data component 330. In such instances, the lidar data transformer 336 may transform the lidar point(s) from a global frame of reference to the vehicle frame of reference, and from the vehicle frame of reference to the specific image capturing device frame of reference. In such instances, the lidar data transformer 336 may align the lidar data to the annotated images 332 based on the frame of reference of the image capturing device. Such a frame of reference may be based on where the image capturing device is positioned relative to the vehicle, the angle of the camera, the type of camera, etc.

In some examples, the object manager 302 may include an annotated pixel verification component 306 configured to determine whether a pixel is associated with an annotation. Based on projecting the lidar points into the annotated images 332, the annotated pixel verification component 306 may identify pixels associated with the projected lidar points, and determine whether the associated pixels are associated with the annotation. The annotated pixel verification component 306 may use a pixel's location and/or pixel identification value to determine whether the pixel is associated with an annotation. In some instances, the annotated pixel verification component 306 may have stored which pixel locations and/or pixel identifiers are associated with the annotation. The annotated pixel verification component 306 may use such stored information to determine whether the location and/or pixel identifier of the pixel is associated with the annotation.

In some examples, the annotated verification component 306 may determine that the projected lidar point is associated with the annotated object based on the lidar point projecting into an annotated pixel for a threshold number of annotated images. In such instances, the annotated verification component 306 may send a subset of lidar points 342 associated with the annotated object to the projecting component 304.

In some examples, the projecting component 304 may be similar or identical to the projecting component 304 discussed above. In such example, the projecting component 304 may perform similar operations to project the subset of lidar points 342 into one or more non-annotated images 334. In such instances, the projecting component 304 may determine that a subset of pixels (e.g., from the non-annotated images 334) may be associated with the subset of lidar points 342.

In some examples, the object manager 302 may include a pixel dilation component 308 configured to determine a dilated subset of pixels based on dilating a subset of pixels associated with the projected lidar points. The pixel dilation component 308 may receive the subset of pixels from the projecting component 304. In such examples, the pixel dilation component 308 may perform a dilation operation on the subset of pixels. The pixel dilation component 308 may determine a dilated subset of pixels based on the subset of pixels associated with the subset of lidar points 342. In order to perform the dilation operation, the pixel dilation component 308 may determine a shaped kernel which may be applied to the subset of pixels. The shape and size of the kernel may vary based on any number of factors (e.g., environment type, type of lidar device, sparseness of the lidar data, etc.).

In some examples, the object manager 302 may include a pixel connection component 310 configured to determine a connection between the dilated pixels. The pixel connection component 310 may connect the dilated pixels based on the dilated pixels intersecting with one another, and associated such intersecting dilated pixels with the same segment identifier. The pixel connection component 310 may determine that dilated pixels intersect if the dilated pixels overlap, touch, and/or are within a threshold distance from one another. The threshold distance may be determined based on numerous factors, such as the environment, the lidar type, the sparseness of the lidar points, the number of dilated pixels, the number of dilated pixels already connected, etc. In some examples, the pixel connection component 310 may determine that intersecting dilated pixels are associated with the same segment identifier. In such examples, the pixel connection component 310 may reference the non-dilated pixels to determine the segment identifier for each dilated pixel. Based on the dilated pixels intersecting and being associated with the same segment identifier, the pixel connection component 310 may connect the dilated pixels.

In some examples, the object manager 302 may include a contour component 312 configured to render a contour around the non-dilated pixels associated with the connected dilated pixels. The contour component 312 may receive the connected dilated pixels from the pixel connection component 310. In some examples, the contour component 312 may identify the non-dilated pixels that correspond to the dilated pixels. Rendering the contour around the non-dilated pixels ensures that the contour is as accurate and closely bound to the object as possible. Based on identifying the non-dilated pixels associated with the dilated pixels, the contour component 312 may render a contour around the outer edge of the pixels. In some examples, the contour component 312 may also fill in the contour with an annotation. In some examples, the annotation may be a color, a pattern, etc.

As shown in this example, the contour component 312 may send the annotated images 338 to machine learning models 340 to be used as training data. In such examples, based on the contour component 312 having rendered a contour and annotation to the image, the contour component 312 may send the annotated images 338 to the machine learning models 340.

Figure 4:
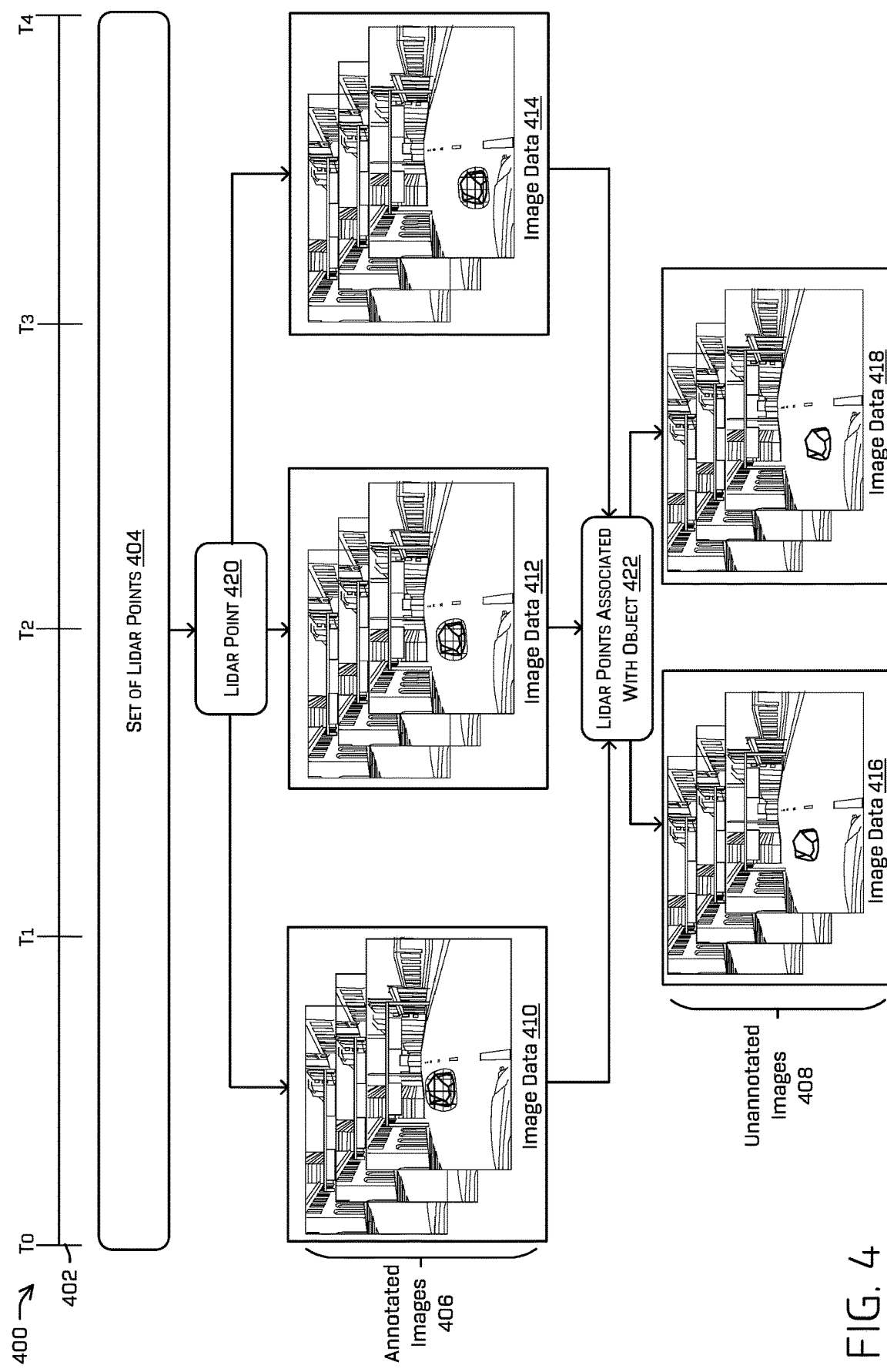
FIG. 4 is a pictorial flow diagram illustrating an example technique for identifying lidar points associated with an object, and using such lidar points to annotate additional images, in accordance with one or more examples of the disclosure.

FIG. 4 is a pictorial flow diagram 400 illustrating an example technique for identifying lidar points associated with an object, and using such lidar points to annotate additional images.

In some examples, the flow diagram 400 may include a timeline 402. In this example, the timeline 402 may start at "$t_0$" and span to "$t_4$"; however, in other examples the timeline 402 may start or stop differing time ranges. In some examples, the flow diagram 400 includes a set of lidar points 404 spanning from "$t_0$" through "$t_4$". The set of lidar points 404 may represent a single point cloud which includes some or all of the lidar points captured from "$t_0$" to "$t_4$". In such instances, the set of lidar points 404 may be accumulated and/or aligned to a global coordinate frame.

In some examples, the flow diagram 400 includes numerous annotated images 406, and numerous unannotated images 408. The annotated images 406 may include numerous clusters of annotated image data which may be captured at different times with respect to the timeline 402. In some examples, the annotated images 406 may include image data 410 which may illustrate three annotated images captured at "$t_0$". The annotated images 406 may include image data 412 which may illustrate three annotated images captured at "$t_2$", and image data 414 which may illustrate three annotated images captured at "$t_4$". In some examples, the unannotated images 408 may include numerous clusters of unannotated image data which were captured at different times with respect to the timeline 402. The unannotated images 408 may include image data 416 which may illustrate three unannotated images captured at "$t_1$", and image data 418 which may illustrate three unannotated images captured at "$t_3$". However, this example is not intended to be limiting, the annotated images 406 and/or the unannotated images 408 may include more or less images within each cluster, and may be captured by the same or different cameras with similar or different fields of view. Further, the annotated images 406 and/or the unannotated images 408 may be at different times on the timeline 402.

In some examples, the flow diagram 400 includes a lidar point 420 which may be associated with the set of lidar points 404. For example, an object manager may iterate through the set of lidar points 404 a project individual lidar points into the annotated images 406. In this example, lidar point 420 may be projected into image data 410, image data 412, and/or image data 414. In such instances, the lidar point 420 may project into some or all of the three images of image data 410, image data 412, and/or image data 414. The object manager may determine whether the lidar point 420 is associated with an annotated pixel, as described above. In such examples, if the lidar point 420 is associated with an annotated pixel in a threshold number of annotated images 406, the lidar point 420 may be identified as associated with the object. Such lidar points may be added to a subset of lidar points that are associated with the annotated object.

In some examples, the flow diagram 400 may include a subset of lidar points 422 associated with the annotated object. As described above, the subset of lidar points may be representative of lidar points from the set of lidar points 404 which were associated with annotated pixels in a threshold number of annotated images 406. In some examples, the object manager may project the subset of lidar points 422 into some or all of the three unannotated images of image data 416 and/or image data 418. In some examples, the subset of lidar points 422 may be used to annotate objects within the unannotated images 408. In some examples, the subset of lidar points 422 may be used to track static objects within the unannotated images 408 through the environment as the static objects go in and out of the field of view for any of the image capturing devices. These techniques enable the object manager to increase the volume to annotated images that are used as machine learning training data, rather than relying on human annotated images.

In some examples, the techniques discussed in FIG. 4 may be used to identify static objects, as well as identify and/or filter dynamic objects. In such examples, if a lidar point projects into one of the annotated images (e.g., at $t_0$), but not into a different annotated image (e.g., at $t_2$), the object manager may determine that the object is a dynamic object.

Figure 5:
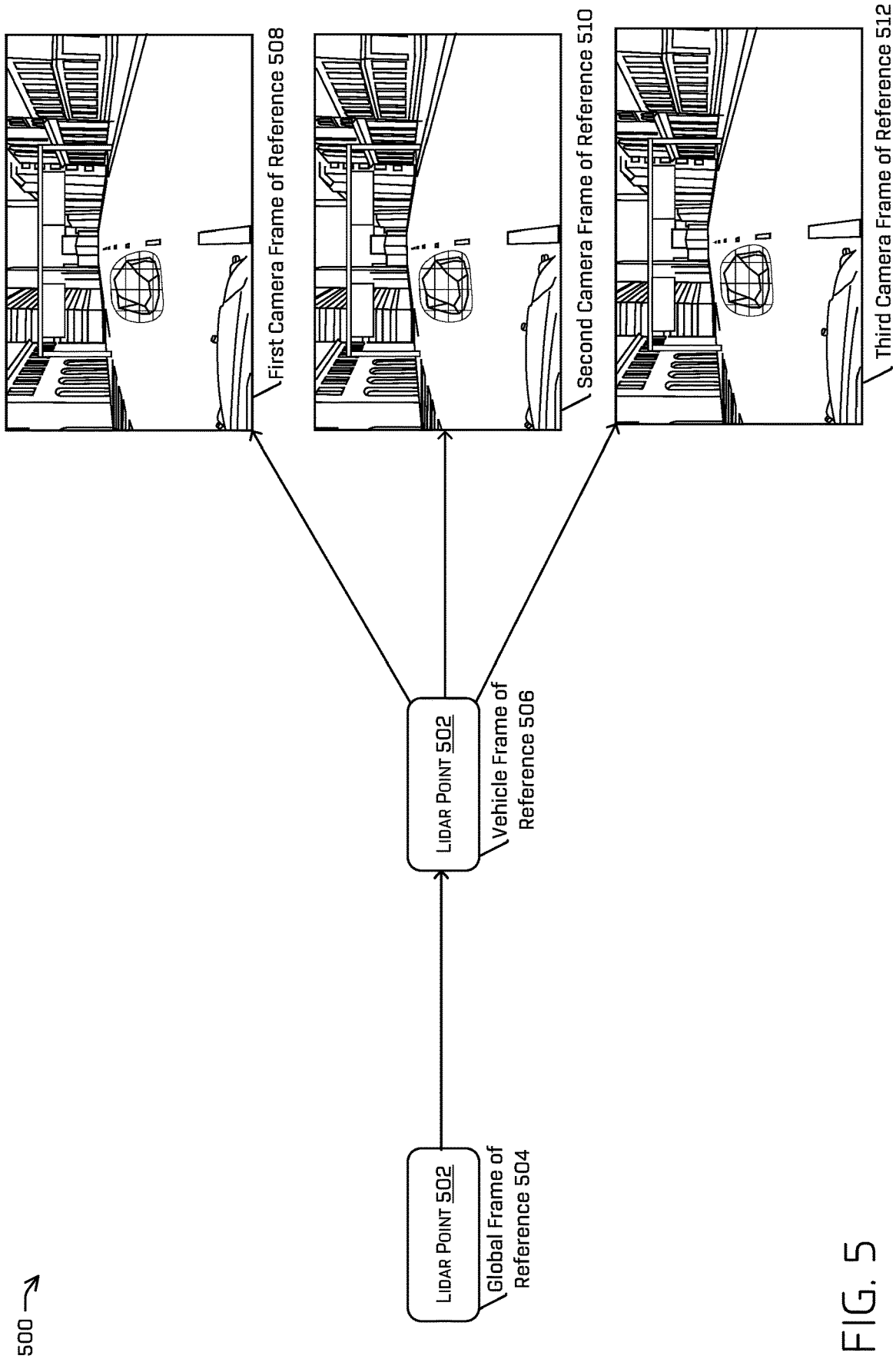
FIG. 5 is a pictorial flow diagram illustrating an example technique for performing transformations on lidar points, in accordance with one or more examples of the disclosure.

FIG. 5 is a pictorial flow diagram 500 illustrating an example technique for performing transformations on lidar data. Specifically, FIG. 5 illustrates the transformations applied to lidar points when such lidar points are projected into two-dimensional images.

In this example, the flow diagram 500 may include a lidar point 502. The lidar point 502 may be stored in a global frame of reference 504. In some examples, the global frame of reference 504 may be based on any location within the environment. Such a global frame of reference 504 may be a stable coordinate frame. In this example, the lidar point 502 may be transformed from the global frame of reference 504 to the vehicle frame of reference 506. The vehicle frame of reference 506 may indicate the coordinates of the lidar point 502 with respect to the vehicle.

In some examples, an object manager may perform transformation operations to the lidar point 502 to transform the lidar point 502 from the vehicle frame of reference 506 to one or more camera reference frames. In some examples, if the object manager intends to project the lidar point 502 into an image (e.g., annotated or unannotated) that was captured by a first camera on the vehicle, the object manager may transform the lidar point 502 to the frame of reference of the first camera 508. Transforming the lidar point 502 to the frame of reference of the first camera 508 may be based on where the first camera is positioned relative to the vehicle, the angle of the camera, the type of camera, etc. Further, if the object manager intends to project the lidar point 502 into an image captured by a second camera, the object manager may transform the lidar point 502 to the frame of reference of the second camera 510. The object manager may perform similar transformations to the lidar point 502 in order to transform the lidar point to the frame of reference of the third camera 512.

Figure 6A:
FIG. 6A depicts an example environment including multiple objects, in accordance with one or more examples of the disclosure.
Figure 6B:
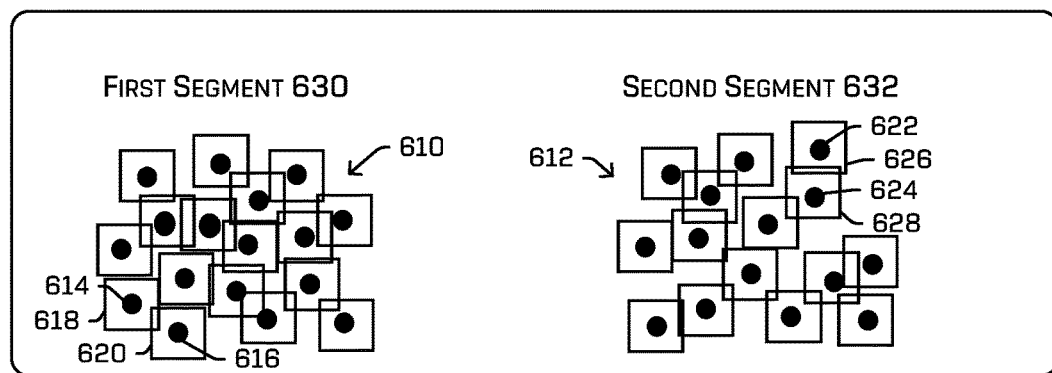
FIG. 6B depicts an example graph including dilated pixels, in accordance with one or more examples of the disclosure.
Figure 6C:
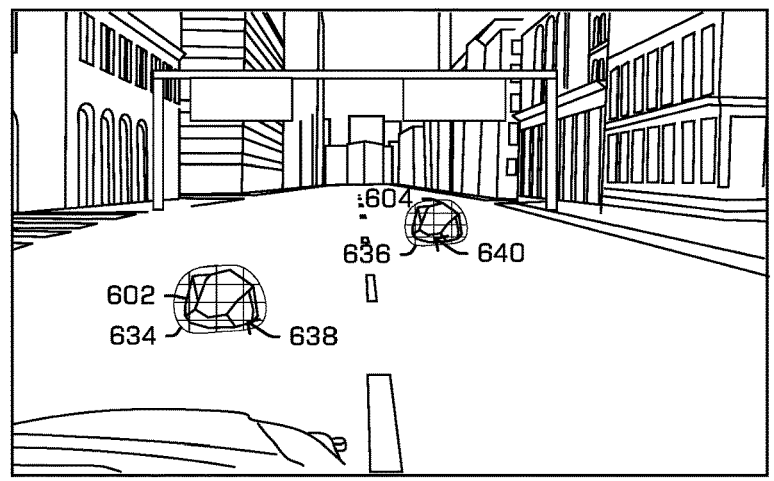
FIG. 6C depicts an example environment including multiple annotated objects, in accordance with one or more examples of the disclosure.

FIGS. 6A-6C depict projected lidar points into an unannotated image, a dilation of pixels associated with the projected lidar points, a rendering of multiple contours around individual objects.

FIG. 6A depicts an example environment 600A including multiple objects. In this example, the example environment 600A includes a first object 602 and a second object 604. As shown in the example environment 600A, the first object 602 and the second object 604 may be debris. In this example, the first object 602 and the second object 604 may be a rock; however, the other examples the first object 602 and the second object 604 may be any other type of static object. In this example, the example environment 600A may include a first set of lidar points 606 and a second set of lidar points 608 which have been projected into the unannotated image. In some examples, the first set of lidar points 606 may be associated with the first object 602, and the second set of lidar points 608 may be associated with the second object 604. In some examples, the first set of lidar points 606 and the second set of lidar points 608 may be associated with a set of pixels of the image.

FIG. 6B depicts an example graph 600B including dilated pixels. In this example, the example graph 600B includes a first subset of pixels 610 (e.g., the black dots) and a second subset of pixels 612 (e.g., the black dots). In some examples, the first subset of pixels 610 may be associated with the first subset of lidar point 606. Further, the second subset of pixels 612 may be associated with the second subset of lidar points 608. In this example, the example graph 600B may include dilated pixels. In some examples, the object manager may dilate the first subset of pixels 610 and the second subset of pixels 612 to determine dilated pixels. In some instances, the first subset of pixels 610 may include a first pixel 614 and a second pixel 616. The object manager may determine dilated pixels for each of the non-dilated pixels. In such instances, the first pixel 614 may be dilated to dilated pixel 618, while the second pixel 616 may be dilated to dilated pixel 620.

In some examples, the object manager may dilate the second subset of pixels 612 to determine dilated pixels. In some instances, the second subset of pixels 612 may include a pixel 622 and a pixel 624. The object manager may determine dilated pixels for each of the non-dilated pixels. In such instances, the pixel 622 may be dilated to dilated pixel 626, while the pixel 624 may be dilated to dilated pixel 628.

In some examples, the object manager may determine whether the dilated pixels intersect and/or are adjacent to one another. As described above, the object manager may connect the pixels based on determining that the dilated pixels are adjacent to one another. In some examples, dilated pixels may be adjacent if the dilated pixels overlap, touch, intersect, and/or are within a threshold distance from one another. For example, the object manager may determine that dilated pixel 618 and dilated pixel 620 intersect. Further, the object manager may determine that dilated pixel 626 and dilated pixel 628 intersect. Based on such dilated pixels being adjacent, the object manager may determine that the dilated pixels are associated with the same segment identifier. In this example, dilated pixel 618 and dilated pixel 620 are associated with a first segment 630, while dilated pixel 626 and dilated pixel 628 are associated with the second segment 632. In this example, the object manager may not connect the dilated pixels of the different segments. Such techniques ensure that the object manager is annotating the object. In this example, the object manager may connect all of the adjacent dilated pixels associated with the first segment 630 into a single group, while connecting all of the adjacent dilated pixels associated with the second segment 632 into a different single group.

FIG. 6C depicts an example environment 600C including multiple annotated objects. In this example, the example environment 600C includes the first object 602 and the second object 604. The example environment 600C includes a first contour 634 and a second contour 636. The first contour 634 may be rendered based on the connected dilated pixels assigned to the first segment 630. The second contour 636 may be rendered based on the connected dilated pixels assigned to the second segment 632. Further, the first contour 634 includes a first annotation 638, while the second contour 636 includes a second annotation 640. In such instances, the first annotation 638 and the second annotation 640 may be illustrated with a checkered pattern. In this example, the annotations may be representative of a static object within the environment.

FIGS. 6A-6C illustrate the purpose of including segment identification information. If the object manager connected the dilated pixels which intersect without regard for segment information, the object manager may build a contour around a portion of the environment that is not associated with an object.

Figure 7:
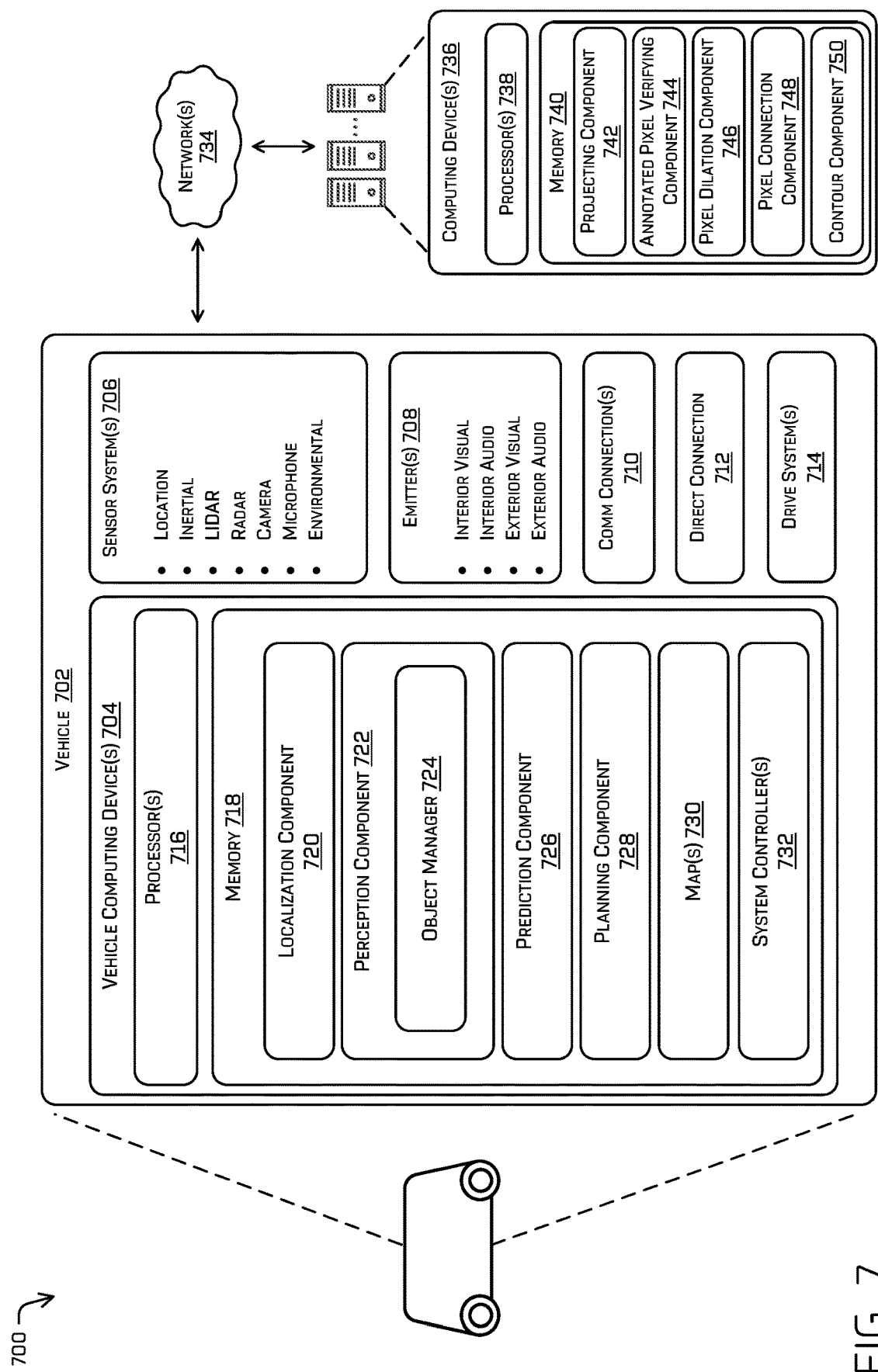
FIG. 7 depicts a block diagram of an example system for implementing various techniques described herein.

FIG. 7 is a block diagram of an example system 700 for implementing the techniques described herein. In at least one example, the system 700 may include a vehicle, such as vehicle 702. The vehicle 702 may include one or more vehicle computing devices 704, one or more sensor systems 706, one or more emitters 708, one or more communication connections 710, at least one direct connection 712, and one or more drive systems 714.

The vehicle computing device 704 may include one or more processors 716 and memory 718 communicatively coupled with the processor(s) 716. In the illustrated example, the vehicle 702 is an autonomous vehicle; however, the vehicle 702 could be any other type of vehicle, such as a semi-autonomous vehicle, or any other system having at least an image capture device (e.g., a camera-enabled smartphone). In some instances, the autonomous vehicle 702 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 702 may be a fully or partially autonomous vehicle having any other level or classification.

In the illustrated example, the memory 718 of the vehicle computing device 704 stores a localization component 720, a perception component 722 including an object manager 724, a prediction component 726, a planner component 728, one or more system controllers 732, and one or more maps 730 (or map data 730). Though depicted in FIG. 7 as residing in the memory 718 for illustrative purposes, it is contemplated that the localization component 720, the perception component 722 including the one or more object manager 724, the prediction component 726, the planner component 728, system controller(s) 732, and/or the map(s) may additionally, or alternatively, be accessible to the vehicle 702 (e.g., stored on, or otherwise accessible by, memory remote from the vehicle 702, such as, for example, on memory 740 of one or more computing device 736). In some examples, the memory 740 may include a projecting component 742, an annotated pixel verifying component 744, a pixel dilation component 746, a pixel connection component 748, and a contour component 750.

In at least one example, the localization component 720 may include functionality to receive sensor data from the sensor system(s) 706 to determine a position and/or orientation of the vehicle 702 (e.g., one or more of an x-, y-, z-position, roll, pitch, or yaw). For example, the localization component 720 may include and/or request/receive a map of an environment, such as from map(s) 730, and may continuously determine a location and/or orientation of the vehicle 702 within the environment. In some instances, the localization component 720 may utilize SLAM (simultaneous localization and mapping), CLAMS (calibration, localization and mapping, simultaneously), relative SLAM, bundle adjustment, non-linear least squares optimization, or the like to receive image data, lidar data, radar data, inertial measurement unit (IMU) data, GPS data, wheel encoder data, and the like to accurately determine a location of the vehicle 702. In some instances, the localization component 720 may provide data to various components of the vehicle 702 to determine an initial position of the vehicle 702 for determining the relevance of an object to the vehicle 702, as discussed herein.

In some instances, the perception component 722 may include functionality to perform object detection, segmentation, and/or classification. In some examples, the perception component 722 may provide processed sensor data that indicates a presence of an object (e.g., entity) that is proximate to the vehicle 702 and/or a classification of the object as an object type (e.g., car, pedestrian, cyclist, animal, building, tree, road surface, curb, sidewalk, unknown, etc.). In some examples, the perception component 722 may provide processed sensor data that indicates a presence of a stationary entity that is proximate to the vehicle 702 and/or a classification of the stationary entity as a type (e.g., building, tree, road surface, curb, sidewalk, unknown, etc.). In additional or alternative examples, the perception component 722 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The object manager 724 may be perform any of the techniques described with respect to any of FIGS. 1-6 above with respect to identifying lidar points that are associated with objects based on annotated two-dimensional images, and annotating such objects within additional two-dimensional images based on the lidar points.

The prediction component 726 may generate one or more probability maps representing prediction probabilities of possible locations of one or more objects in an environment. For example, the prediction component 726 may generate one or more probability maps for vehicles, pedestrians, animals, and the like within a threshold distance from the vehicle 702. In some instances, the prediction component 726 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

In some examples, the prediction component 726 may generate predicted trajectories of objects (e.g., objects) in an environment. For example, the prediction component 726 may generate one or more predicted trajectories for objects within a threshold distance from the vehicle 702. In some examples, the prediction component 726 may measure a trace of an object and generate a trajectory for the object based on observed and predicted behavior.

In general, the planner component 728 may determine a path for the vehicle 702 to follow to traverse through an environment. For example, the planner component 728 may determine various routes and trajectories and various levels of detail. For example, the planner component 728 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planner component 728 may generate an instruction for guiding the vehicle 702 along at least a portion of the route from the first location to the second location. In at least one example, the planner component 728 may determine how to guide the vehicle 702 from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle. In various examples, the planner component 728 may select a trajectory for the vehicle 702.

In other examples, the planner component 728 may alternatively, or additionally, use data from the localization component 720, the perception component 722, and/or the prediction component 726 to determine a path for the vehicle 702 to follow to traverse through an environment. For example, the planner component 728 may receive data (e.g., object data) from the localization component 720, the perception component 722, and/or the prediction component 726 regarding objects associated with an environment. In some examples, the planner component 728 receives data for relevant objects within the environment. Using this data, the planner component 728 may determine a route to travel from a first location (e.g., a current location) to a second location (e.g., a target location) to avoid objects in an environment. In at least some examples, such a planner component 728 may determine there is no such collision-free path and, in turn, provide a path that brings vehicle 702 to a safe stop avoiding all collisions and/or otherwise mitigating damage.

In at least one example, the vehicle computing device 704 may include one or more system controllers 732, which may be configured to control steering, propulsion, braking, safety, emitters, communication, and other systems of the vehicle 702. The system controller(s) 732 may communicate with and/or control corresponding systems of the drive system(s) 714 and/or other components of the vehicle 702.

The memory 718 may further include one or more maps 730 that may be used by the vehicle 702 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 702 may be controlled based at least in part on the map(s) 730. That is, the map(s) 730 may be used in connection with the localization component 720, the perception component 722, the prediction component 726, and/or the planner component 728 to determine a location of the vehicle 702, detect objects in an environment, generate routes, determine actions and/or trajectories to navigate within an environment.

In some examples, the one or more maps 730 may be stored on a remote computing device(s) (such as the computing device(s) 736) accessible via network(s) 734. In some examples, multiple maps 730 may be stored based on, for example, a characteristic (e.g., type of entity, time of day, day of week, season of the year, etc.). Storing multiple maps 730 may have similar memory requirements, but increase the speed at which data in a map may be accessed.

In some instances, aspects of some or all of the components discussed herein may include any models, techniques, and/or machine-learned techniques. For example, in some instances, the components in the memory 718 (and the memory 740, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 706 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 706 may include multiple instances of each of these or other types of sensors. For instance, the lidar sensors may include individual lidar sensors located at the corners, front, back, sides, and/or top of the vehicle 702. As another example, the camera sensors may include multiple cameras disposed at various locations about the exterior and/or interior of the vehicle 702. The sensor system(s) 706 may provide input to the vehicle computing device 704. Additionally, or in the alternative, the sensor system(s) 706 may send sensor data, via the one or more networks 734, to the one or more computing device(s) 736 at a particular frequency, after a lapse of a predetermined period of time, in near real-time, etc.

The vehicle 702 may also include one or more emitters 708 for emitting light and/or sound. The emitter(s) 708 may include interior audio and visual emitters to communicate with passengers of the vehicle 702. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 708 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 702 may also include one or more communication connections 710 that enable communication between the vehicle 702 and one or more other local or remote computing device(s). For instance, the communication connection(s) 710 may facilitate communication with other local computing device(s) on the vehicle 702 and/or the drive system(s) 714. Also, the communication connection(s) 710 may allow the vehicle to communicate with other nearby computing device(s) (e.g., computing device 736, other nearby vehicles, etc.) and/or one or more remote sensor system(s) for receiving sensor data. The communications connection(s) 710 also enable the vehicle 702 to communicate with a remote teleoperations computing device or other remote services.

The communications connection(s) 710 may include physical and/or logical interfaces for connecting the vehicle computing device 704 to another computing device or a network, such as network(s) 734. For example, the communications connection(s) 710 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 702 may include one or more drive systems 714. In some examples, the vehicle 702 may have a single drive system 714. In at least one example, if the vehicle 702 has multiple drive systems 714, individual drive systems 714 may be positioned on opposite ends of the vehicle 702 (e.g., the front and the rear, etc.). In at least one example, the drive system(s) 714 may include one or more sensor systems to detect conditions of the drive system(s) 714 and/or the surroundings of the vehicle 702. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 714. In some cases, the sensor system(s) on the drive system(s) 714 may overlap or supplement corresponding systems of the vehicle 702 (e.g., sensor system(s) 706).

The drive system(s) 714 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 714 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 714. Furthermore, the drive system(s) 714 may also include one or more communication connection(s) that enable communication by the respective drive module with one or more other local or remote computing device(s).

In at least one example, the direct connection 712 may provide a physical interface to couple the one or more drive system(s) 714 with the body of the vehicle 702. For example, the direct connection 712 may allow the transfer of energy, fluids, air, data, etc. between the drive system(s) 714 and the vehicle. In some instances, the direct connection 712 may further releasably secure the drive system(s) 714 to the body of the vehicle 702.

In at least one example, the localization component 720, the perception component 722, the object manager 724, the prediction component 726, the planner component 728, the one or more system controllers 732, and the one or more maps 730 may process sensor data, as described above, and may send their respective outputs, over the one or more network(s) 734, to the computing device(s) 736. In at least one example, the localization component 720, the perception component 722, the object manager 724, the prediction component 726, the planner component 728, the one or more system controllers 732, and the one or more maps 730 may send their respective outputs to the computing device(s) 736 at a particular frequency, after a lapse of a predetermined period of time, in near real-time, etc.

In some examples, the vehicle 702 may send sensor data to the computing device(s) 736 via the network(s) 734. In some examples, the vehicle 702 may receive sensor data from the computing device(s) 736 and/or remote sensor system(s) via the network(s) 734. The sensor data may include raw sensor data and/or processed sensor data and/or representations of sensor data. In some examples, the sensor data (raw or processed) may be sent and/or received as one or more log files.

The computing device(s) 736 may include processor(s) 738 and a memory 740, which may include a projecting component 742, an annotated pixel verifying component 744, a pixel dilation component 746, a pixel connection component 748, and a contour component 750. In some examples, the memory 740 may store one or more of components that are similar to the component(s) stored in the memory 718 of the vehicle 702. In such examples, the computing device(s) 736 may be configured to perform one or more of the processes described herein with respect to the vehicle 702. In some examples, the projecting component 742, an annotated pixel verifying component 744, a pixel dilation component 746, a pixel connection component 748, and a contour component 750 may perform substantially similar functions as the object manager 724.

The processor(s) 716 of the vehicle 702 and the processor(s) 738 of the computing device(s) 736 may be any suitable processor capable of executing instructions to process data and perform operations as described herein. By way of example and not limitation, the processor(s) may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 718 and memory 740 are examples of non-transitory computer-readable media. The memory 718 and memory 740 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 7 is illustrated as a distributed system, in alternative examples, components of the vehicle 702 may be associated with the computing device(s) 736 and/or components of the computing device(s) 736 may be associated with the vehicle 702. That is, the vehicle 702 may perform one or more of the functions associated with the computing device(s) 736, and vice versa.

The methods described herein represent sequences of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes. In some examples, one or more operations of the method may be omitted entirely. For instance, the operations may include determining a first action and a second action by the vehicle relative to a selected trajectory without determining a respective cost for one or more of the actions by the vehicle. Moreover, the methods described herein may be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Figure 8:
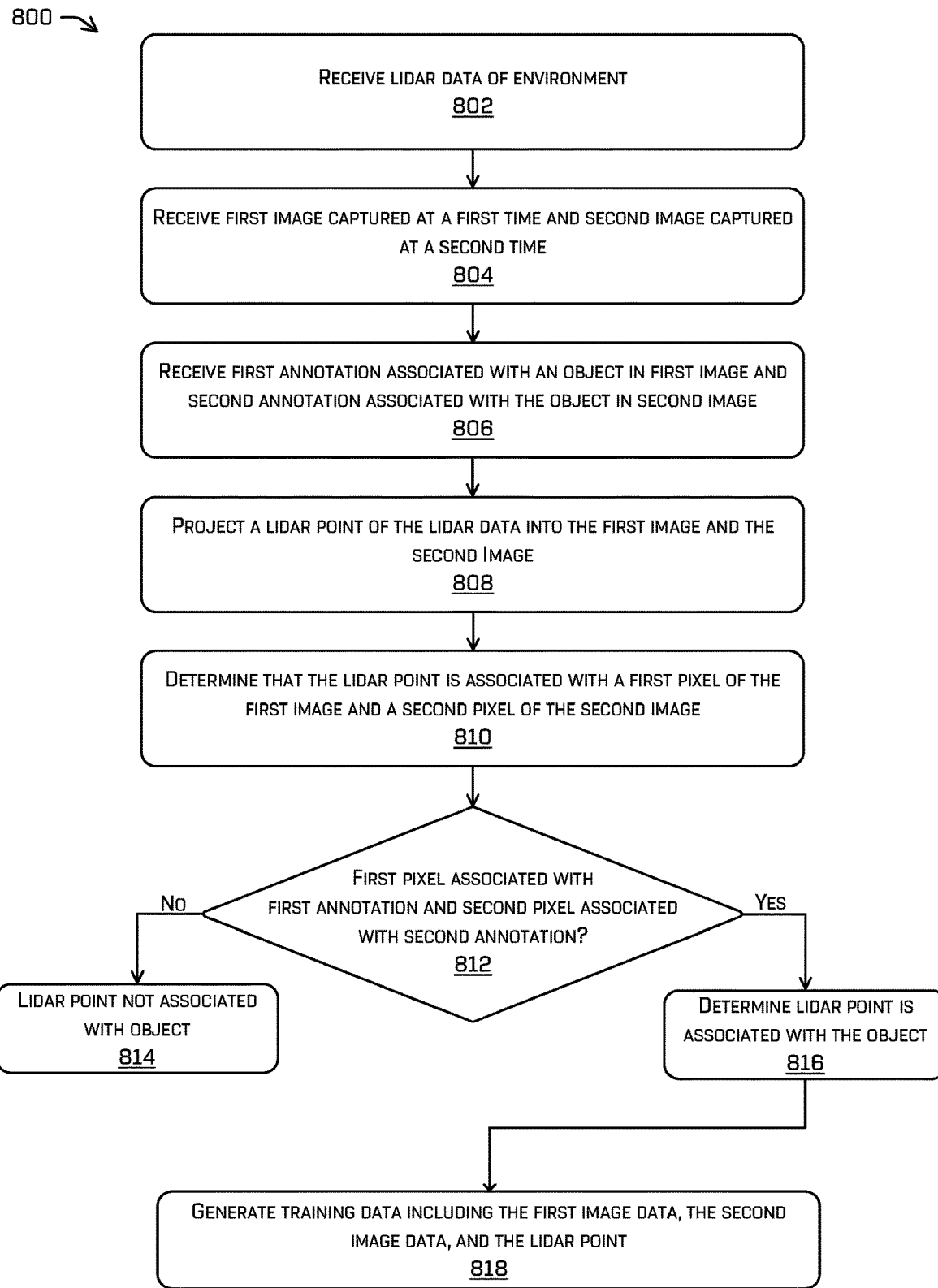
FIG. 8 is a flow diagram illustrating an example process of identifying and associating lidar points with objects based on annotated two-dimensional images, in accordance with one or more examples of the disclosure.

FIG. 8 is a flow diagram illustrating an example process 800 of identifying and associating lidar points with objects based on annotated two-dimensional images by an object manager 302. As described below, process 800 may be performed by one or more computer-based components configured to implement various functionalities described herein. For instance, process 800 may be performed by an object manager 302 configured to identify lidar points that are associated with objects, and use such lidar data to annotate objects in two-dimensional images. As described above, the object manager 302 may be integrated as an on-vehicle system in some examples. However, in other examples, the object manager 302 may be integrated as a separate server-based system.

Process 800 is illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation. Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

At operation 802, the object manager 302 may receive lidar data from a lidar device of an autonomous vehicle. In some examples, the autonomous vehicle may include multiple lidar devices configured to receive lidar data of the driving environment. Further, the object manager 302 may receive lidar data from the lidar devices mounted or installed at different locations on a vehicle and/or a same lidar at different times as the vehicle traverses the environment. In such examples, the lidar data may include a set of lidar points representative of lidar detections of physical objects in the environment.

In some examples, the object manager 302 may receive lidar data captured over a period of time. For example, the object manager 302 may receive lidar data captured by the vehicle over a period of time (e.g., six seconds, eight seconds, ten seconds, sixty seconds, etc.). The object manager 302 may receive the lidar data as a single lidar point cloud. In such examples, the object manager 302 may transform and/or accumulate the lidar points to a global reference frame (e.g., global coordinate frame).

At operation 804, the object manager 302 may receive a first two-dimensional image captured at a first time and a second two-dimensional image captured at a second time. In some examples, the autonomous vehicle may include multiple image capturing devices configured to receive image data of the driving environment. Further, the object manager 302 may receive image data from a number of image capturing devices mounted or installed at different locations on the vehicle and/or a same image capturing device at different times as the vehicle traverses through the environment. In some examples, the image data may include a set of pixels with associated pixel identifiers.

At operation 806, the object manager 302 may receive a first annotation associated with an object within the first image, and a second annotation associated with the object within the second image. In some examples, the object manager 302 may receive multiple images, some of which may include annotated objects, while other images may not include annotations. In such instances, the object manager 302 may receive the first image and the second image which have been annotated by a human annotator. Such annotations may identify static objects within the images.

At operation 808, the object manager 302 may project a lidar point of the accumulation of lidar points into the first image and the second image. The object manager 302 may project the lidar point into the first and second images by associating the lidar point with the corresponding pixel of the image data. In some examples, the projection of the lidar point to the first and second images by the object manager 302 may be based on performing one or more transformations to the lidar data. Such transformations may include transforming the lidar point from the global reference frame to a reference frame of the autonomous vehicle, and further transforming the lidar point from the vehicle reference frame to the reference frame of the image capturing device.

At operation 810, the object manager 302 may determine that the lidar point is associated with a first pixel within the first image and a second pixel within the second image. As described above, the object manager 302 may determine that the lidar point is associated with the first and second pixels based on projecting the lidar points into the first and second images.

At operation 812, the object manager 302 may determine whether the first pixel and the second pixel are associated with the first annotation and the second annotation, respectively. The object manager 302 may identify pixels based on the location of the pixel within the image and/or pixel identification values. As such, the object manager 302 may identify the location and/or pixel identifier of the first pixel, and the location and/or pixel identifier of the second pixel. If the object manager 302 determines that the locations and/or pixel identifiers of the first pixel and the second pixel are not associated with the first and second annotations, respectively (812:No), the object manager 302 may determine that the lidar point is not associated with the annotated object. At operation 814, the object manager 302 may identify the lidar point as not being associated with a static object within the driving environment.

In contrast, if the object manager 302 determines that the locations and/or pixel identifiers of the first pixel and the second pixel are associated with the first and second annotations, respectively, (812:Yes), the object manager 302 may determine that the lidar point is associated with the object. At operation 816, the object manager 302 may determine that the lidar point is associated with the annotated object. The object manager 302 may determine that the lidar point is associated with the annotated object based on the lidar point projecting into an annotated pixel for a threshold number of the annotated images. In this example, the object manager 302 has two annotated images (e.g., the first image and the second image). Further, the object manager 302 may project a lidar point into each of the two annotated images, as described in operation 808. The object manager 302 may determine whether the lidar point is associated with an annotated pixel in each of the two annotated images. Based on determining that the first pixel and the second pixel being annotated pixels of the annotated images, the object manager 302 may determine that the lidar point is associated with the annotated object.

At operation 818, the object manager 302 can include generating training data including sensor data. For example, the object manager 302 may generate training data for machine learning models. Such training data may include the first image data, the second image data, and/or the lidar point(s).

Figure 9:
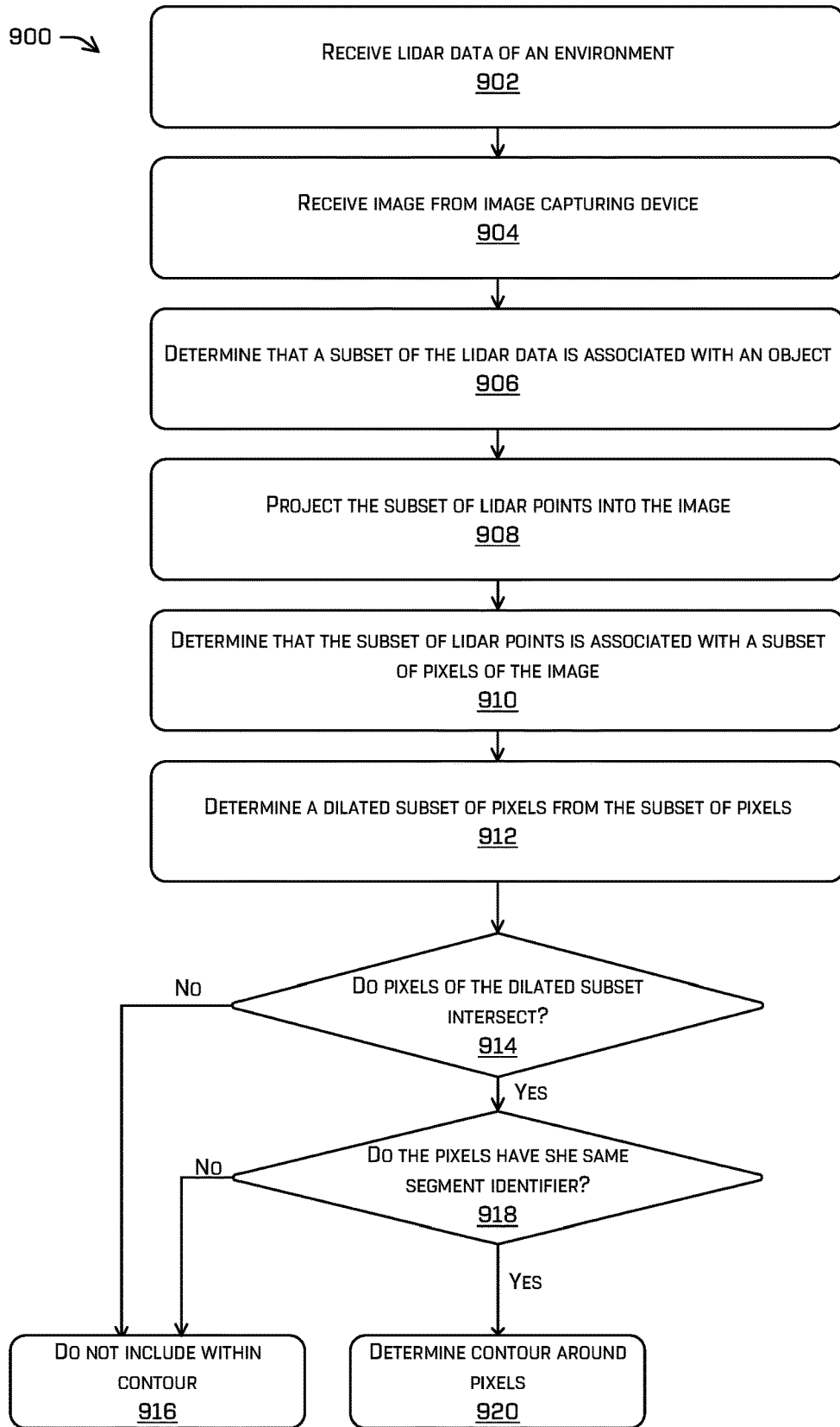
FIG. 9 is a flow diagram illustrating an example process of annotating objects within two-dimensional images based on lidar data representative of the objects, in accordance with one or more examples of the disclosure.

FIG. 9 is a flow diagram illustrating an example process 900 of annotating objects within two-dimensional images based on lidar data associated with the objects by an object manager 302. As described below, process 900 may be performed by one or more computer-based components configured to implement various functionalities described herein. For instance, process 900 may be performed by an object manager 302 configured to identify lidar points that are associated with objects, and use such lidar data to annotate objects in two-dimensional images. As described above, the object manager 302 may be integrated as an on-vehicle system in some examples. However, in other examples, the object manager 302 may be integrated as a separate server-based system.

Process 900 is illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation. Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

At operation 902, the object manager 302 may receive lidar data from a lidar device of an autonomous vehicle. In some examples, the autonomous vehicle may include multiple lidar devices configured to receive lidar data of the driving environment. Further, the object manager 302 may receive lidar data from the lidar devices mounted or installed at different locations on a vehicle and/or a same lidar at different times as the vehicle traverses the environment. In such examples, the lidar data may include a set of lidar points representative of lidar detections of physical objects in the environment.

In some examples, the object manager 302 may receive lidar data captured over a period of time. For example, the object manager 302 may receive lidar data captured by the vehicle over a period of time (e.g., six seconds, eight seconds, ten seconds, sixty seconds, etc.). The object manager 302 may receive the lidar data as a single lidar point cloud. In such examples, the object manager 302 may transform and/or accumulate the lidar points to a global reference frame (e.g., global coordinate frame).

At operation 904, the object manager 302 may receive a two-dimensional image captured by an image capturing device. In some examples, the autonomous vehicle may include multiple image capturing devices configured to receive image data of the driving environment. Further, the object manager 302 may receive image data from a number of image capturing devices mounted or installed at different locations on the vehicle and/or a same image capturing device at different times as the vehicle traverses through the environment. In some examples, the image data may include a set of pixels with associated pixel identifiers.

At operation 906, the object manager 302 may determine that a subset of lidar points of the accumulated set of lidar points are associated with an object within the environment. In some examples, the object manager may perform the same or similar techniques described in FIG. 8 and/or FIGS. 1-5. For example, the object manager 302 may receive a plurality of annotated images. Such annotations may identify static objects within the driving environment. In some instances, the object manager 302 may project a lidar point (e.g., of the accumulated lidar data) into an annotated image and determine that the lidar point is associated with an annotated pixel. Based on the pixel being associated with the annotated object, the object manager 302 may determine that the lidar point is associated with object. In some examples, the object manager 302 may determine a subset of lidar points that are associated with the object. However, this is not intended to be limiting, the object manager may use any number of techniques to identify lidar points that are associated with static objects.

At operation 908, the object manager 302 may project the subset of lidar points into the image received at operation 904. For example, the object manager 302 may associate the subset of lidar points to the image covering the same or similar location of the environment. In such examples, the object manager 302 may perform transformations which may include transforming the lidar point from the global reference frame to a reference frame of the autonomous vehicle, and further transforming the lidar point from the vehicle reference frame to the reference frame of the image capturing device.

At operation 910, the object manager 302 may determine that a subset of pixels of the image may be associated with the subset of lidar points. For example, the projected subset of lidar points may be associated with a subset of pixels. In such examples, the subset of pixels (e.g., from the image) and the subset of lidar points may be associated with a same or similar location of the physical environment.

At operation 912, the object manager 302 may perform a morphological operation to the subset of pixels. For example, the object manager 302 may perform a dilation operation on the subset of pixels. The object manager 302 may determine a dilated subset of pixels based on the subset of pixels associated with the subset of lidar points. In some examples, the object manager 302 may apply a shaped (e.g., square, circle, etc.) kernel to the pixels in performing the dilation technique.

At operation 914, the object manager 302 may use the dilated subset of pixels to determine whether some or all of the dilated pixels are adjacent to one another. For example, dilated pixels may be adjacent if the dilated pixels overlap, touch, intersect, and/or are within a threshold distance from one another. In such instances, the threshold distance may be determined based on a number of different factors, such as the environment, the time of day, the number of dilated pixels, and/or other such factors. If the object manager 302 determines that some or all of the dilated pixels are not adjacent to one another (914:No), the object manager 302 may not render a contour around such pixel(s). At operation 916, the object manager 302 determines that dilated pixels which are not adjacent to other dilated pixels may not be included within the rendered contour.

In contrast, if the object manager 302 determines that some of all of the dilated pixels are adjacent to one another (914:Yes), the object manager 302 may determine whether the adjacent pixels are associated with the same segment identifier. At operation 918, the object manager 302 may determine that the adjacent dilated pixels are associated with the same segment identifier. Images may include one or more static objects. As such, to ensure that each static object is accurately annotated, the object manager 302 may determine that each static object is associated with a different group or segment identifier. In such examples, the object manager 302 may determine whether each pixel is associated with the same segment identifier. If the adjacent pixels are not associated with the same segment identifier (918:No), the object manager 302 may not render a contour around each pixel as described at operation 916.

In contrast, if the adjacent pixels are associated with the same segment identifier (918:Yes), the object manager 302 may determine a contour around the corresponding non-dilated pixels, and fill in the contour with an annotation (e.g., color, pattern, etc.). At operation 920, the object manager 302 may identify the non-dilated pixels that correspond to the dilated pixels. For example, the object manager 302 may parse through the connected dilated pixels and identify the non-dilated pixel associated with each dilated pixel. Based on identifying the non-dilated pixels associated with the dilated pixels, the object manager 302 may render a contour around such non-dilated pixels. In such instances, the object manager 302 may fill in the contour with a color, pattern, etc. In some examples, the filled in contour may be illustrative of the annotated object within the driving environment.

Example Clauses

A: A system comprising: one or more processors; and one or more computer-readable media storing computer-executable instructions that, when executed, cause the one or more processors to perform operations comprising: receiving lidar data associated with a vehicle operating in an environment, the lidar data including a set of lidar points; receiving first image data associated with the environment, the first image data including a first set of pixels with first respective pixel identifiers, wherein the first image data is associated with a first time; receiving second image data associated with the environment, the second image data including a second set of pixels with second respective pixel identifiers, wherein the second image data is associated with a second time different than the first time; receiving a first annotation associated with an object within the first image data, wherein the first annotation is associated with the first respective pixel identifiers for a first subset of the first set of pixels, and wherein the first annotation identifies the object as a first static debris object; receiving a second annotation associated with the object within the second image data, wherein the second annotation is associated with the second respective pixel identifiers for a second subset of the second set of pixels, and wherein the second annotation identifies the object as a second static debris object; projecting a lidar point of the set of lidar points into the first image data and the second image data; determining that the lidar point is associated with a first pixel of the first set of pixels and a second pixel of the second set of pixels; determining, based at least in part on determining that the first pixel is associated with a first pixel identifier of the first respective pixel identifiers and the second pixel is associated with a second pixel identifier of the second respective pixel identifiers, that the first pixel is associated with the first annotation and the second pixel is associated with the second annotation; determining, based at least in part on the first pixel being associated with the first annotation and the second pixel being associated with the second annotation, that the lidar point is associated with the object; and generating training data comprising the first image data, the second image data, and the lidar point.

B: The system of paragraph A, further comprising: receiving third image data including a third set of pixels, wherein the third image data is from a third time that is different than the first time or the second time; projecting, based at least in part on the lidar point being associated with the object, the lidar point into the third image data; determining that the lidar point is associated with a third pixel of the third set of pixels; and transferring, based at least in part on the lidar point being associated with the third pixel, the first annotation from the first image data to the third image data.

C: The system of paragraph A, wherein receiving the set of lidar points comprises: determining an accumulation of lidar points received from the first time to the second time, wherein the accumulation of lidar points comprise a common reference frame.

D: The system of paragraph A, wherein determining that the lidar point is associated with the object comprises: determining a total number of annotated images; projecting the lidar point into the total number of annotated images; determining, based at least in part on projecting the lidar point into the total number of annotated images, that the lidar point is associated with an annotated pixel in a number of the annotated images; and determining, based at least in part on determining that the number of annotated images meets or exceeds a threshold number of images, that lidar point is associated with the object.

E: The system of paragraph A, wherein projecting the lidar point into the first image data comprises: determining that the lidar point is in a global reference frame; and determining, based at least in part on the lidar point being in a global reference frame, a first transformation of the lidar point from the global reference frame to a first reference frame of a first image capturing device and a second transformation of the lidar point from the global reference frame to a second reference frame of a second image capturing device, wherein the first reference frame is different than the second reference frame.

F: The system of paragraph A, further comprising: training a machine learning model to detect a static object within environments, wherein input to the machine learning model includes the training data.

G: One or more non-transitory computer-readable media storing instructions executable by one or more processors, wherein the instructions, when executed, cause the one or more processors to perform operations comprising: receiving lidar data representing an environment, the lidar data including a set of lidar points; receiving first image data associated with the environment, the first image data including a first set of pixels, wherein the first image data is associated with a first time; receiving second image data associated with the environment, the second image data including a second set of pixels, wherein the second image data is associated with a second time different than the first time; receiving a first annotation associated with an object within the first image data, wherein the first annotation is a first static object; receiving a second annotation associated with the object within the second image data, wherein the second annotation is a second static object; projecting a lidar point of the set of lidar points into the first image data and the second image data; determining that the lidar point is associated with a first pixel of the first set of pixels and a second pixel of the second set of pixels; and determining, based at least in part on determining that the first pixel is associated with the first annotation and the second pixel is associated with the second annotation, that the lidar point is associated with the object.

H: The one or more non-transitory computer-readable media of paragraph G, the operations further comprising: receiving third image data including a third set of pixels, wherein the third image data was captured at a third time that is different than the first time or the second time; projecting, based at least in part on the lidar point being associated with the object, the lidar point into the third image data; determining that the lidar point is associated with a third pixel of the third set of pixels; and transferring, based at least in part on the lidar point being associated with the third pixel, the first annotation from the first image data to the third image data.

I: The one or more non-transitory computer-readable media of paragraph G, wherein receiving the set of lidar points comprises: determining an accumulation of lidar points from the first time to the second time, wherein the accumulation of lidar points comprise a common reference frame.

J: The one or more non-transitory computer-readable media of paragraph G, wherein determining that the lidar point is associated with the object comprises: determining a total number of annotated images; projecting the lidar point into the total number of annotated images; determining, based at least in part on projecting the lidar point into the total number of annotated images, that the lidar point is associated with an annotated pixel in a number of the annotated images; and determining, based at least in part on determining that the number of annotated images meets or exceeds a threshold number of images, that lidar point is associated with the object.

K: The one or more non-transitory computer-readable media of paragraph G, wherein projecting the lidar point into the image data comprises: determining that the lidar point is in a global reference frame; and determining, based at least in part on the lidar point being in a global reference frame, a first transformation of the lidar point from the global reference frame to a first reference frame of a first image capturing device and a second transformation of the lidar point from the global reference frame to a second reference frame of a second image capturing device, wherein the first reference frame is different than the second reference frame.

L: The one or more non-transitory computer-readable media of paragraph G, wherein the first image data is captured by a first image capturing device and the second image data is captured by a second image capturing device, wherein the first image capturing device is different than the second image capturing device.

M: The one or more non-transitory computer-readable media of paragraph G, wherein the first annotation is associated with respective pixel identifiers for a first subset of the first set of pixels, wherein determining that the first pixel is associated with the first annotation comprises: determining that the first pixel is associated with a first pixel identifier, wherein the first pixel identifier comprises a location of the first pixel within the first image data; and determining, based at least in part on comparing the location with the respective pixel identifiers for the first subset of pixels, that the location of the first pixel associated with the first annotation.

N: The one or more non-transitory computer-readable media of paragraph G, the operations further comprising: generating training data comprising the first image data, the second image data, and the lidar point; training a machine learning model based on the training data; and controlling a vehicle based at least in part on the machine learning model.

O: A method comprising: receiving lidar data representing an environment, the lidar data including a set of lidar points; receiving first image data associated with the environment, the first image data including a first set of pixels, wherein the first image data is associated with a first time; receiving second image data associated with the environment, the second image data including a second set of pixels, wherein the second image data is associated with a second time different than the first time; receiving a first annotation associated with an object within the first image data, wherein the first annotation is a first static object; receiving a second annotation associated with the object within the second image data, wherein the second annotation is a second static object; projecting a lidar point of the set of lidar points into the first image data and the second image data; determining that the lidar point is associated with a first pixel of the first set of pixels and a second pixel of the second set of pixels; and determining, based at least in part on determining that the first pixel is associated with the first annotation and the second pixel is associated with the second annotation, that the lidar point is associated with the object.

P: The method of paragraph O, further comprising: receiving third image data including a third set of pixels, wherein the third image data was captured at a third time that is different than the first time or the second time; projecting, based at least in part on the lidar point being associated with the object, the lidar point into the third image data; determining that the lidar point is associated with a third pixel of the third set of pixels; and transferring, based at least in part on the lidar point being associated with the third pixel, the first annotation from the first image data to the third image data.

Q: The method of paragraph O, wherein receiving the set of lidar points comprises: determining an accumulation of lidar points from the first time to the second time, wherein the accumulation of lidar points comprise a common reference frame.

R: The method of paragraph O, wherein determining that the lidar point is associated with the object comprises: determining a total number of annotated images; projecting the lidar point into the total number of annotated images; determining, based at least in part on projecting the lidar point into the total number of annotated images, that the lidar point is associated with an annotated pixel in a number of the annotated images; and determining, based at least in part on determining that the number of annotated images meets or exceeds a threshold number of images, that lidar point is associated with the object.

S: The method of paragraph O, wherein projecting the lidar point into the first image data comprises: determining that the lidar point is in a global reference frame; and determining, based at least in part on the lidar point being in a global reference frame, a first transformation of the lidar point from the global reference frame to a first reference frame of a first image capturing device and a second transformation of the lidar point from the global reference frame to a second reference frame of a second image capturing device, wherein the first reference frame is different than the second reference frame.

T: The method of paragraph O, further comprising: generating training data comprising the first image data, the second image data, and the lidar point; and training a machine learning model based at least in part on the training data.

U: A system comprising: one or more processors; and one or more computer-readable media storing computer-executable instructions that, when executed, cause the one or more processors to perform operations comprising: receiving image data associated with an environment, the image data including a set of pixels; receiving lidar data associated the environment, the lidar data including a set of lidar points; determining that a subset of the set of lidar points are associated with an object; projecting the subset of lidar points into the image data; determining, based at least in part on projecting the subset of lidar points into the image data, that the subset of lidar points is associated with a subset of pixels of the set of pixels; determining, based at least in part on the subset of lidar points being associated with the subset of pixels, a dilated subset of pixels; determining adjacent pixels associated with the dilated subset of pixels; determining segment identifiers associated with the adjacent pixels; determining, based at least in part on the adjacent pixels and the segment identifiers, that the dilated subset of pixels is associated with the object; determining, based at least in part on the dilated subset of pixels being associated with the object, a contour representing the object in the image data; and generating training data based at least in part on the contour.

V: The system of paragraph U, the operations further comprising: training a machine learning model to detect static objects within environments, wherein input to the machine learning model includes the training data.

W: The system of paragraph U, wherein the contour is a first contour, the operations further comprising: projecting the subset of lidar points into the image data; determining that the subset of lidar points are associated with a second subset of pixels of the set of pixels; determining that the second subset of pixels is associated with a second object; and determining a second contour representing a second object in the environment.

X: The system of paragraph U, the operations further comprising, determining that a portion of the subset of pixels are located within the contour; and determining, based at least in part on the portion of pixels being within the contour, that the portion of pixels are associated with the object.

Y: The system of paragraph U, wherein projecting the subset of lidar points into the image data comprises: determining that the subset of lidar points is in a global frame of reference; and determining, based at least in part on the subset of lidar points being in a global frame of reference, a first transformation of the subset of lidar points from the global frame of reference to a reference frame of an image capturing device.

Z: One or more non-transitory computer-readable media storing instructions executable by one or more processors, wherein the instructions, when executed, cause the one or more processors to perform operations comprising: receiving image data associated with an environment, the image data including a set of pixels; receiving lidar data associated the environment, the lidar data including a set of lidar points; determining that a subset of the set of lidar points are associated with an object; projecting the subset of lidar points into the image data; determining, based at least in part on projecting the subset of lidar points into the image data, that the subset of lidar points is associated with a subset of pixels of the set of pixels; determining, based at least in part on the subset of pixels, a dilated subset of pixels; determining segment identifiers associated with the dilated subset of pixels; determining, based at least in part on the segment identifiers, that the dilated subset of pixels is associated with the object; determining, based at least in part on the dilated subset of pixels being associated with the object, a contour representing the object in the image data; and generating training data based at least in part on the contour.

AA: The one or more non-transitory computer-readable media of paragraph Z, the operations further comprising: training a machine learning model to detect static objects within a driving environment, wherein input to the machine learning model includes the training data.

AB: The one or more non-transitory computer-readable media of paragraph Z, wherein the contour is a first contour, the operations further comprising: projecting the subset of lidar points into the image data; determining that the subset of lidar points are associated with a second subset of pixels of the set of pixels; determining that the second subset of pixels is associated with a second object; and determining a second contour representing a second object in the environment.

AC: The one or more non-transitory computer-readable media of paragraph Z, the operations further comprising, determining that a portion of the subset of pixels are located within the contour; and determining, based at least in part on the portion of pixels being within the contour, that the portion of pixels are associated with the object.

AD: The one or more non-transitory computer-readable media of paragraph Z, wherein projecting the subset of lidar points into the image data comprises: determining that the subset of lidar points is in a global frame of reference; and determining, based at least in part on the subset of lidar points being in a global frame of reference, a first transformation of the subset of lidar points from the global frame of reference to a reference frame of an image capturing device.

AE: The one or more non-transitory computer-readable media of paragraph Z, wherein determining that the dilated subset of pixels is associated with the object comprises determining that a first dilated pixel of the dilated subset of pixels is adjacent to a second dilated pixel of the dilated subset of pixels.

AF: The one or more non-transitory computer-readable media of paragraph Z, wherein the image data is from a first time, and wherein receiving the set of lidar points comprises: determining an accumulation of lidar points received from a second time to a third time, wherein the first time is between the second time and the third time, and wherein the accumulation of lidar points comprise a common reference frame.

AG: The one or more non-transitory computer-readable media of paragraph Z, wherein the image data is from a first time, and wherein determining that the subset of lidar points are associated with the object comprises: receiving second image data including a second set of pixels, wherein the second image data was captured at a second time that is different than the first time; projecting the set of lidar points into the second image data; determining that a lidar point of the set of lidar points is associated with a first pixel of the second set of pixels; determining, based at least in part on the lidar point being associated with the first pixel, that the first pixel is associated with an annotated object; and determining, based at least in part on determining that the first pixel is associated with the annotated object, that the lidar point is associated with the object.

AH: A method comprising: receiving image data associated with an environment, the image data including a set of pixels; receiving lidar data associated the environment, the lidar data including a set of lidar points; determining that a subset of the set of lidar points are associated with an object; projecting the subset of lidar points into the image data; determining, based at least in part on projecting the subset of lidar points into the image data, that the subset of lidar points is associated with a subset of pixels of the set of pixels; determining, based at least in part on the subset of pixels, a dilated subset of pixels; determining segment identifiers associated with the dilated subset of pixels; determining, based at least in part on the segment identifiers, that the dilated subset of pixels is associated with the object; determining, based at least in part on the dilated subset of pixels being associated with the object, a contour representing the object in the image data; and generating training data based at least in part on the contour.

AI: The method of paragraph AH, further comprising: training a machine learning model to detect static objects within a driving environment, wherein input to the machine learning model includes the training data.

AJ: The method of paragraph AH, wherein the contour is a first contour, further comprising: projecting the subset of lidar points into the image data; determining that the subset of lidar points are associated with a second subset of pixels of the set of pixels; determining that the second subset of pixels is associated with a second object; and determining a second contour representing a second object in the environment.

AK: The method of paragraph AH, further comprising, determining that a portion of the subset of pixels are located within the contour; and determining, based at least in part on the portion of pixels being within the contour, that the portion of pixels are associated with the object.

AL: The method of paragraph AH, wherein projecting the subset of lidar points into the image data comprises: determining that the subset of lidar points is in a global frame of reference; and determining, based at least in part on the subset of lidar points being in a global frame of reference, a first transformation of the subset of lidar points from the global frame of reference to a reference frame of an image capturing device.

AM: The method of paragraph AH, wherein determining that the dilated subset of pixels is associated with the object comprises determining that a first dilated pixel of the dilated subset of pixels is adjacent to a second dilated pixel of the dilated subset of pixels.

AN: The method of paragraph AH, wherein the image data is from a first time, and wherein determining that the subset of lidar points are associated with the object comprises: receiving second image data including a second set of pixels, wherein the second image data was captured at a second time that is different than the first time; projecting the set of lidar points into the second image data; determining that a lidar point of the set of lidar points is associated with a first pixel of the second set of pixels; determining, based at least in part on the lidar point being associated with the first pixel, that the first pixel is associated with an annotated object; and determining, based at least in part on determining that the first pixel is associated with the annotated object, that the lidar point is associated with the object.

While the example clauses described above are described with respect to particular implementations, it should be understood that, in the context of this document, the content of the example clauses can be implemented via a method, device, system, a computer-readable medium, and/or another implementation. Additionally, any of examples A-AN may be implemented alone or in combination with any other one or more of the examples A-AN.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
one or more processors; and
one or more computer-readable media storing computer-executable instructions that, when executed, cause the one or more processors to perform operations comprising:
receiving lidar data associated with a vehicle operating in an environment, the lidar data including a set of lidar points;
receiving first image data associated with the environment, the first image data including a first set of pixels with first respective pixel identifiers, wherein the first image data is associated with a first time;
receiving second image data associated with the environment, the second image data including a second set of pixels with second respective pixel identifiers, wherein the second image data is associated with a second time different than the first time;
receiving a first annotation associated with an object within the first image data, wherein the first annotation is associated with the first respective pixel identifiers for a first subset of the first set of pixels, and wherein the first annotation identifies the object as a first static debris object;
receiving a second annotation associated with the object within the second image data, wherein the second annotation is associated with the second respective pixel identifiers for a second subset of the second set of pixels, and wherein the second annotation identifies the object as a second static debris object;
projecting a lidar point of the set of lidar points into the first image data and the second image data;
determining that the lidar point is associated with a first pixel of the first set of pixels and a second pixel of the second set of pixels;
determining, based at least in part on determining that the first pixel is associated with a first pixel identifier of the first respective pixel identifiers and the second pixel is associated with a second pixel identifier of the second respective pixel identifiers, that the first pixel is associated with the first annotation and the second pixel is associated with the second annotation;
determining, based at least in part on the first pixel being associated with the first annotation and the second pixel being associated with the second annotation, that the lidar point is associated with the object; and
generating training data comprising the first image data, the second image data, and the lidar point.

2. The system of claim 1, further comprising:
receiving third image data including a third set of pixels, wherein the third image data is from a third time that is different than the first time or the second time;
projecting, based at least in part on the lidar point being associated with the object, the lidar point into the third image data;
determining that the lidar point is associated with a third pixel of the third set of pixels; and
transferring, based at least in part on the lidar point being associated with the third pixel, the first annotation from the first image data to the third image data.

3. The system of claim 1, wherein receiving the set of lidar points comprises:
determining an accumulation of lidar points received from the first time to the second time, wherein the accumulation of lidar points comprise a common reference frame.

4. The system of claim 1, wherein determining that the lidar point is associated with the object comprises:
determining a total number of annotated images;
projecting the lidar point into the total number of annotated images;
determining, based at least in part on projecting the lidar point into the total number of annotated images, that the lidar point is associated with an annotated pixel in a number of the annotated images; and
determining, based at least in part on determining that the number of annotated images meets or exceeds a threshold number of images, that lidar point is associated with the object.

5. The system of claim 1, wherein projecting the lidar point into the first image data comprises:
   determining that the lidar point is in a global reference frame; and
   determining, based at least in part on the lidar point being in a global reference frame, a first transformation of the lidar point from the global reference frame to a first reference frame of a first image capturing device and a second transformation of the lidar point from the global reference frame to a second reference frame of a second image capturing device, wherein the first reference frame is different than the second reference frame.

6. The system of claim 1, further comprising:
   training a machine learning model to detect a static object within environments, wherein input to the machine learning model includes the training data.

7. One or more non-transitory computer-readable media storing instructions executable by one or more processors, wherein the instructions, when executed, cause the one or more processors to perform operations comprising:
   receiving lidar data representing an environment, the lidar data including a set of lidar points;
   receiving first image data associated with the environment, the first image data including a first set of pixels, wherein the first image data is associated with a first time;
   receiving second image data associated with the environment, the second image data including a second set of pixels, wherein the second image data is associated with a second time different than the first time;
   receiving a first annotation associated with an object within the first image data, wherein the first annotation is a first static object;
   receiving a second annotation associated with the object within the second image data, wherein the second annotation is a second static object;
   projecting a lidar point of the set of lidar points into the first image data and the second image data;
   determining that the lidar point is associated with a first pixel of the first set of pixels and a second pixel of the second set of pixels; and
   determining, based at least in part on determining that the first pixel is associated with the first annotation and the second pixel is associated with the second annotation, that the lidar point is associated with the object.

8. The one or more non-transitory computer-readable media of claim 7, the operations further comprising:
   receiving third image data including a third set of pixels, wherein the third image data was captured at a third time that is different than the first time or the second time;
   projecting, based at least in part on the lidar point being associated with the object, the lidar point into the third image data;
   determining that the lidar point is associated with a third pixel of the third set of pixels; and
   transferring, based at least in part on the lidar point being associated with the third pixel, the first annotation from the first image data to the third image data.

9. The one or more non-transitory computer-readable media of claim 7, wherein receiving the set of lidar points comprises:
   determining an accumulation of lidar points from the first time to the second time, wherein the accumulation of lidar points comprise a common reference frame.

10. The one or more non-transitory computer-readable media of claim 7, wherein determining that the lidar point is associated with the object comprises:
    determining a total number of annotated images;
    projecting the lidar point into the total number of annotated images;
    determining, based at least in part on projecting the lidar point into the total number of annotated images, that the lidar point is associated with an annotated pixel in a number of the annotated images; and
    determining, based at least in part on determining that the number of annotated images meets or exceeds a threshold number of images, that lidar point is associated with the object.

11. The one or more non-transitory computer-readable media of claim 7, wherein projecting the lidar point into the image data comprises:
    determining that the lidar point is in a global reference frame; and
    determining, based at least in part on the lidar point being in a global reference frame, a first transformation of the lidar point from the global reference frame to a first reference frame of a first image capturing device and a second transformation of the lidar point from the global reference frame to a second reference frame of a second image capturing device, wherein the first reference frame is different than the second reference frame.

12. The one or more non-transitory computer-readable media of claim 7, wherein the first image data is captured by a first image capturing device and the second image data is captured by a second image capturing device, wherein the first image capturing device is different than the second image capturing device.

13. The one or more non-transitory computer-readable media of claim 7, wherein the first annotation is associated with respective pixel identifiers for a first subset of the first set of pixels, wherein determining that the first pixel is associated with the first annotation comprises:
    determining that the first pixel is associated with a first pixel identifier, wherein the first pixel identifier comprises a location of the first pixel within the first image data; and
    determining, based at least in part on comparing the location with the respective pixel identifiers for the first subset of pixels, that the location of the first pixel associated with the first annotation.

14. The one or more non-transitory computer-readable media of claim 7, the operations further comprising:
    generating training data comprising the first image data, the second image data, and the lidar point;
    training a machine learning model based on the training data; and
    controlling a vehicle based at least in part on the machine learning model.

15. A method comprising:
    receiving lidar data representing an environment, the lidar data including a set of lidar points;
    receiving first image data associated with the environment, the first image data including a first set of pixels, wherein the first image data is associated with a first time;
    receiving second image data associated with the environment, the second image data including a second set of pixels, wherein the second image data is associated with a second time different than the first time;

receiving a first annotation associated with an object within the first image data, wherein the first annotation is a first static object;
receiving a second annotation associated with the object within the second image data, wherein the second annotation is a second static object;
projecting a lidar point of the set of lidar points into the first image data and the second image data;
determining that the lidar point is associated with a first pixel of the first set of pixels and a second pixel of the second set of pixels; and
determining, based at least in part on determining that the first pixel is associated with the first annotation and the second pixel is associated with the second annotation, that the lidar point is associated with the object.

16. The method of claim 15, further comprising:
receiving third image data including a third set of pixels, wherein the third image data was captured at a third time that is different than the first time or the second time;
projecting, based at least in part on the lidar point being associated with the object, the lidar point into the third image data;
determining that the lidar point is associated with a third pixel of the third set of pixels; and
transferring, based at least in part on the lidar point being associated with the third pixel, the first annotation from the first image data to the third image data.

17. The method of claim 15, wherein receiving the set of lidar points comprises:
determining an accumulation of lidar points from the first time to the second time, wherein the accumulation of lidar points comprise a common reference frame.

18. The method of claim 15, wherein determining that the lidar point is associated with the object comprises:
determining a total number of annotated images;
projecting the lidar point into the total number of annotated images;
determining, based at least in part on projecting the lidar point into the total number of annotated images, that the lidar point is associated with an annotated pixel in a number of the annotated images; and
determining, based at least in part on determining that the number of annotated images meets or exceeds a threshold number of images, that lidar point is associated with the object.

19. The method of claim 15, wherein projecting the lidar point into the first image data comprises:
determining that the lidar point is in a global reference frame; and
determining, based at least in part on the lidar point being in a global reference frame, a first transformation of the lidar point from the global reference frame to a first reference frame of a first image capturing device and a second transformation of the lidar point from the global reference frame to a second reference frame of a second image capturing device, wherein the first reference frame is different than the second reference frame.

20. The method of claim 15, further comprising:
generating training data comprising the first image data, the second image data, and the lidar point; and
training a machine learning model based at least in part on the training data.

* * * * *